US007420526B2

(12) United States Patent
Morita

(10) Patent No.: US 7,420,526 B2
(45) Date of Patent: Sep. 2, 2008

(54) IMAGE MANAGING METHOD, IMAGE MANAGING APPARATUS, IMAGE MANAGING PROGRAM AND STORAGE MEDIUM

(75) Inventor: Tetsu Morita, Fuchu (JP)

(73) Assignee: Olympus Corporation, Tokyo (JP)

( * ) Notice: Subject to any disclaimer, the term of this patent is extended or adjusted under 35 U.S.C. 154(b) by 532 days.

(21) Appl. No.: 11/079,616

(22) Filed: Mar. 14, 2005

(65) Prior Publication Data
US 2005/0210411 A1 Sep. 22, 2005

(30) Foreign Application Priority Data
Mar. 17, 2004 (JP) ............... 2004-075968

(51) Int. Cl.
G09G 5/00 (2006.01)
(52) U.S. Cl. ...................... 345/1.1; 345/156
(58) Field of Classification Search .............. 345/2.1, 345/1.1, 1.2, 2.2, 1.3, 552, 553, 565, 748; 709/246; 715/838, 825, 963
See application file for complete search history.

(56) References Cited

U.S. PATENT DOCUMENTS

2002/0178450 A1* 11/2002 Morita et al. ............... 725/61
2003/0217074 A1* 11/2003 Wallace .................... 707/104.1
2004/0125150 A1 7/2004 Adcock et al.
2004/0264734 A1* 12/2004 Wakao ....................... 382/100

FOREIGN PATENT DOCUMENTS

JP 11-215457 8/1999
JP 11215457 * 8/1999

* cited by examiner

Primary Examiner—Nitin Patel
(74) Attorney, Agent, or Firm—Straub and Pokotylo; John C. Pokotylo

(57) ABSTRACT

An image managing method of an image managing apparatus having an image memory which stores an image file provided with date and time information, and a display portion which displays a first display area and a second display area, includes, selecting a display mode as a system which displays in the second display area, displaying a plurality of unit periods which are used to select a period in the first display area, selecting at least one unit period from the plurality of unit periods, displaying a calendar of the selected unit period in the second display area when the display mode is a calendar display mode, extracting from the image memory an image file provided with date and time information included in the selected period when the display mode is an index display mode, and displaying an index image of the extracted image file in the second display area.

19 Claims, 24 Drawing Sheets

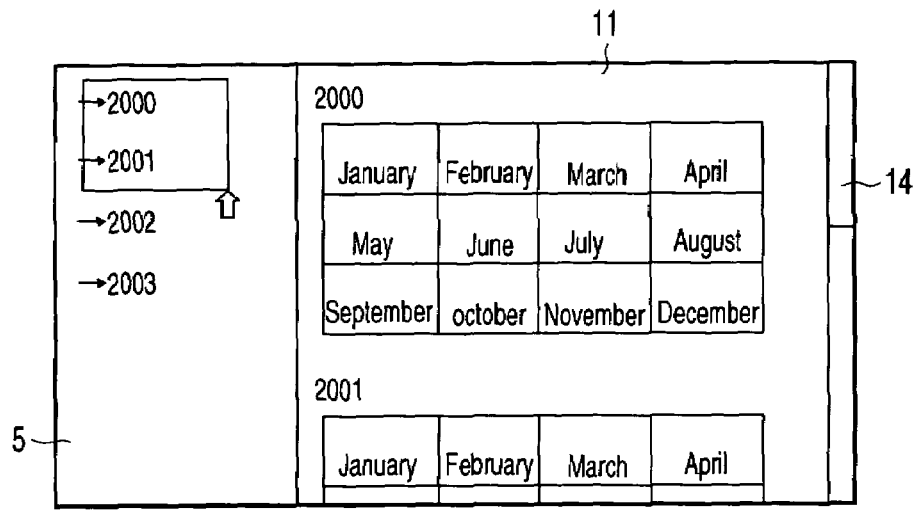

FIG. 5

| | Single | Plural | |
|---|---|---|---|
| | | Identical rewrite mode | Difference rewrite mode |
| Year | Rewriting year | Rewriting years of all images | Rewriting years with top image as reference |
| Month | Rewriting year / month | Rewriting years / months of all images | Rewriting years / months with top image as reference |
| Day | Rewriting year / month / day | Rewriting years / months / days of all images | Rewriting years / months / days with top image as reference |
| Others | Saving based on date information | Saving based on date information | |

FIG. 6

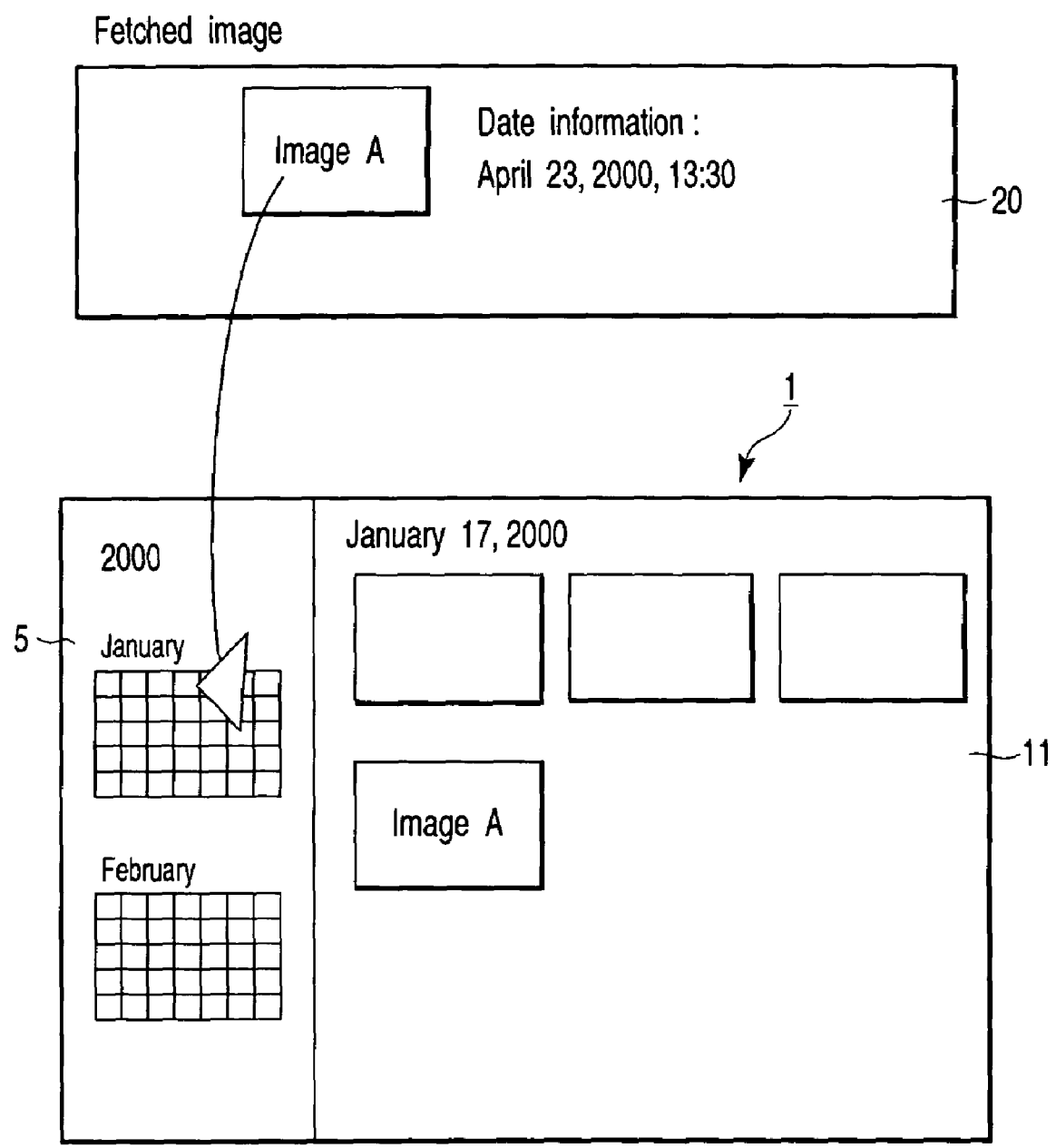
F I G. 7

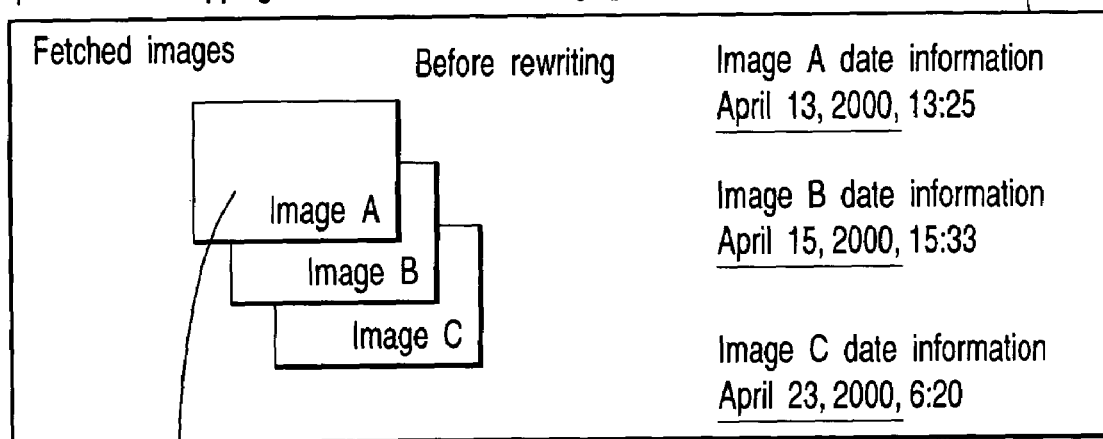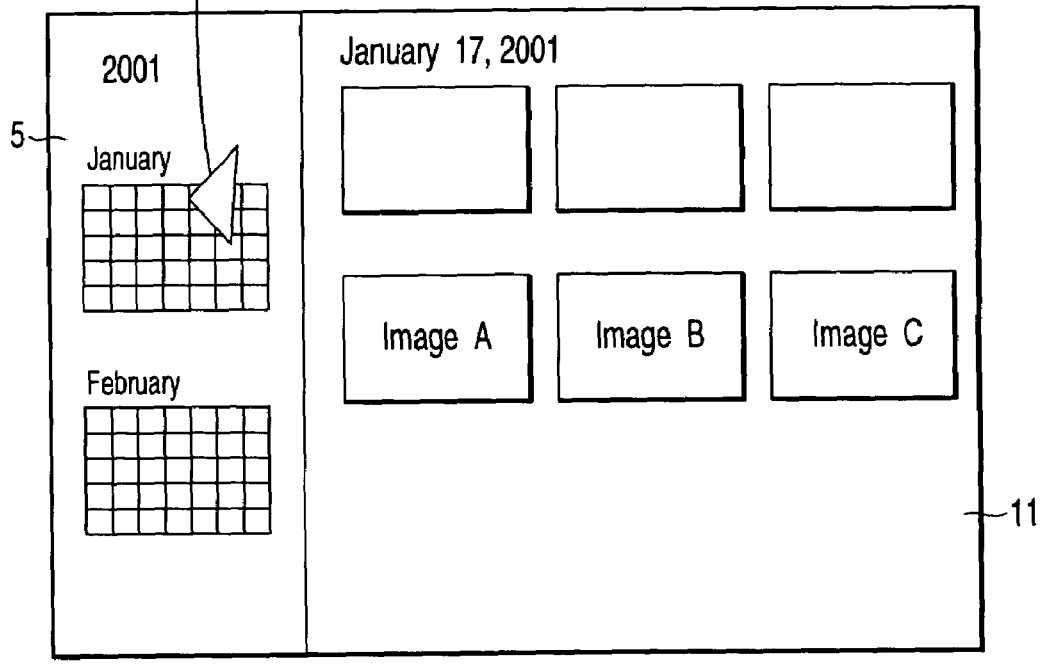
FIG. 8

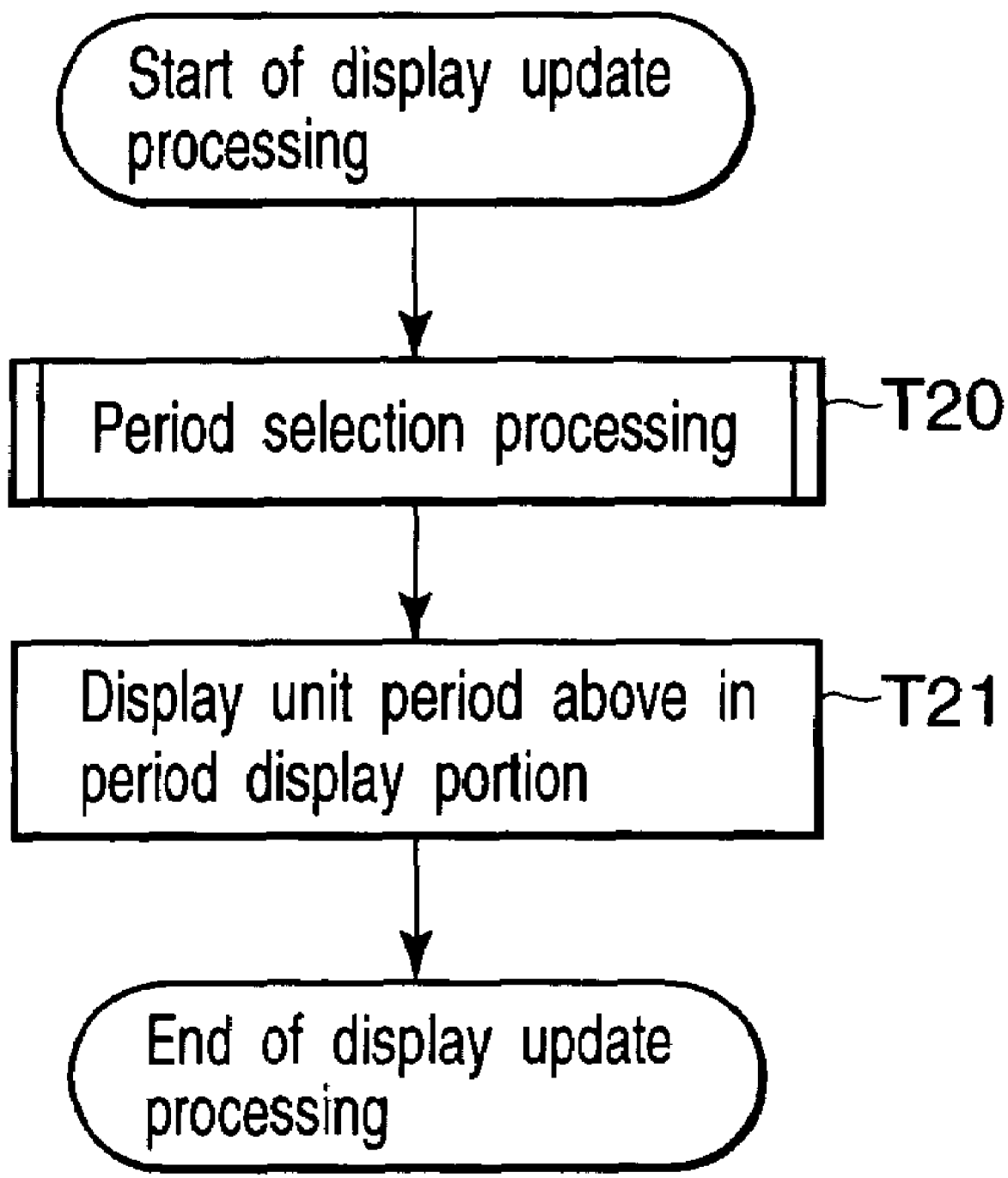
F I G. 16

IMAGE MANAGING METHOD, IMAGE MANAGING APPARATUS, IMAGE MANAGING PROGRAM AND STORAGE MEDIUM

CROSS-REFERENCE TO RELATED APPLICATIONS

This application is based upon and claims the benefit of priority from prior Japanese Patent Application No. 2004-075968, filed Mar. 17, 2004, the entire contents of which are incorporated herein by reference.

BACKGROUND OF THE INVENTION

1. Field of the Invention

The present invention relates to an image managing technique which displays and manages an image.

2. Description of the Related Art

In order to retrieve an image captured and recorded by a digital camera, a method which can retrieve the image with the excellent operational ability is desired.

A method which can readily retrieve a captured image, is disclosed in Jpn. Pat. Appln. KOKAI Publication No. 11-215457. In this method, a reduced image of a recorded captured image is displayed in a calendar every period. Thus, when a user specifies a date and points a desired reduced image displayed in the calendar, a captured image of the pointed image is reproduced and displayed.

BRIEF SUMMARY OF THE INVENTION

A first aspect of the present invention is directed to an image managing method of an image managing apparatus having an image memory which stores an image file provided with date and time information, and a display portion which displays a first display area and a second display area, includes, selecting a display mode as a system which displays in the second display area, displaying a plurality of unit periods which are used to select a period in the first display area, selecting at least one unit period from the plurality of unit periods displayed in the first display area, displaying a calendar of the selected unit period in the second display area when the selected display mode is a calendar display mode, extracting from the image memory an image file provided with date and time information included in the selected period when the selected display mode is an index display mode, and displaying an index image of the extracted image file in the second display area.

A second aspect of the present invention is directed to an image managing program of an image managing apparatus having an image memory which stores an image file provided with date and time information, and a display portion which displays a first display area and a second display area, the program causing a computer to execute, a display mode selection step which selects a display mode as a system which displays in the second display area, a period display step which displays a plurality of unit periods which are used to select a period in the first display area, a period selection step which selects at least one unit period from the plurality of unit periods displayed in the first display area at the period display step, a calendar display step which displays in the second display area a calendar of the unit period selected at the period selection step when the selected display mode is a calendar display mode, and an index image display step which extracts from the image storing means an image file provided with date and time information included in the period selected at the period selection step and displays an index image of the extracted image file in the second display area when the selected display mode is an index display mode.

A third aspect of the present invention is directed to a storage medium in which an image managing program of an image managing apparatus is recorded, the image managing apparatus having an image memory which stores an image file provided with date and time information and a display portion which displays a first display area and a second display area, the storage medium having a program recorded therein, the program causing a computer to execute, a display mode selection step which selects a display mode as a system which displays in the second display area, a period display step which displays a plurality of unit periods which are used to select a period in the first display area, a period selection step which selects at least one unit period from the plurality of unit periods displayed in the first display area at the period display step, a calendar display step which displays in the second display area a calendar of a unit period selected at the period selection step when the selected display mode is a calendar display mode, and an index image display step which extracts from the image storing means an image file provided with date and time information included in the period selected at the period selection step and displays an index image of the extracted image file in the second display area when the selected display mode is an index display mode.

A fourth aspect of the present invention is directed to an image managing apparatus having an image memory which stores an image file provided with date and time information, and a display portion which displays a first display area and a second display area, includes, a display mode selection portion which selects a display mode as a system which displays in the second display area, a period display portion which displays a plurality of unit periods which are used to select a period in the first display area, a period selection portion which selects at least one unit period from the plurality of unit periods displayed in the period display portion, a calendar display portion which displays a calendar of the unit period selected by the period selection portion in the second display area when the selected display mode is a calendar display mode, and an index image display portion which extracts from the image memory an image file provided with date and time information included in the unit period selected by the period selection portion and displays an index image of the image file in the second display area when the selected display mode is an index display mode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a view showing a state of selecting a plurality of periods;

FIG. 6 is a view collectively showing drag and drop operations;

FIG. 7 is a view illustrating an operation of dropping a single image on a displayed date in the period display area;

FIG. 8 is a view illustrating an identical rewrite mode;

FIG. 16 is a flowchart showing a display update processing procedure;

DETAILED DESCRIPTION OF THE INVENTION

In an image managing method according to an embodiment of the present invention, a user executes management and a retrieval operation of an image based on an image managing screen displayed in a display portion of an image managing apparatus.

Figure 1:
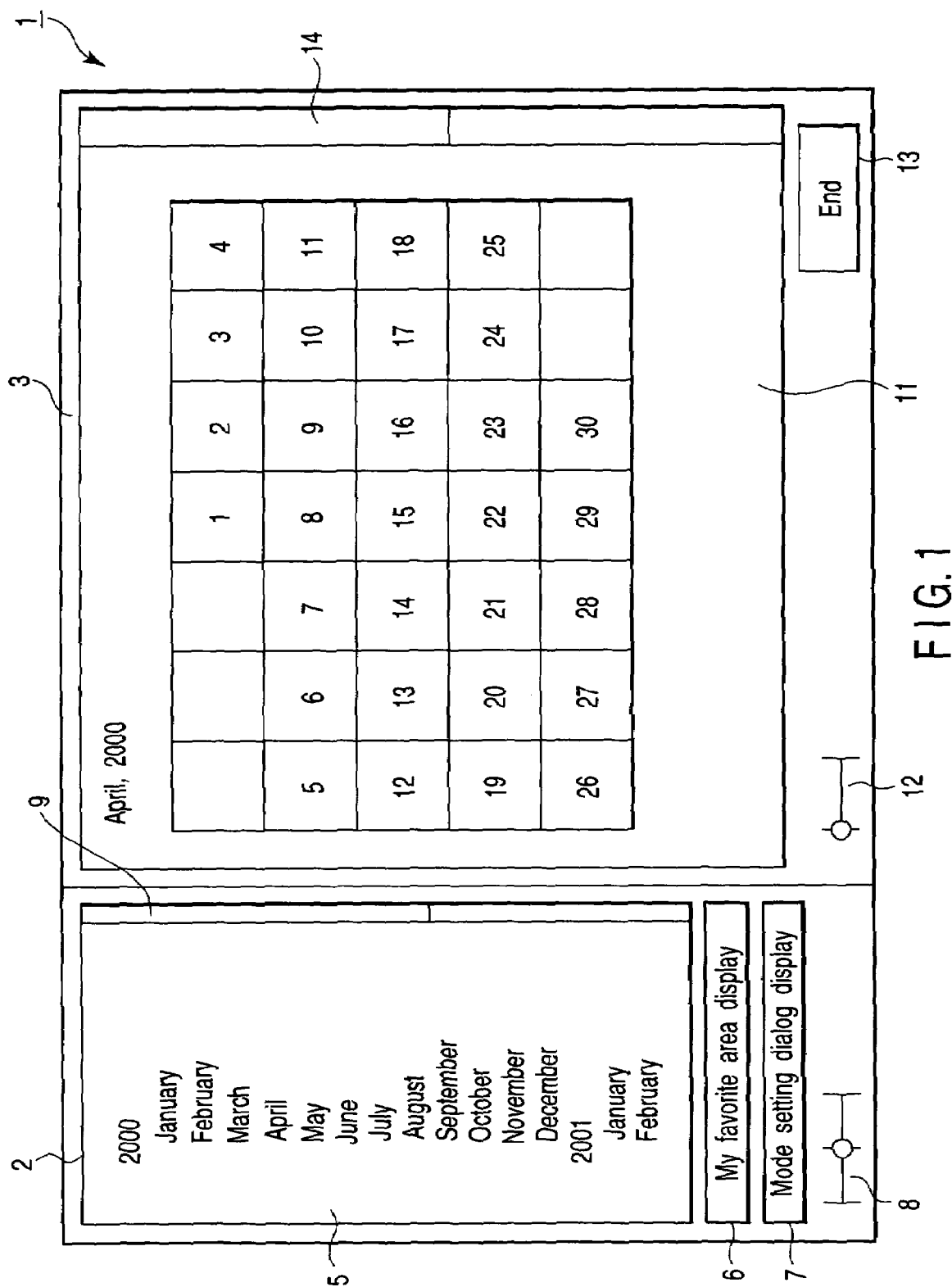
FIG. 1 is a view showing a configuration of an image managing screen based on an image managing method according to an embodiment of the present invention.

FIG. 1 is a view showing a configuration of the image managing screen based on the image managing method according to a first embodiment of the present invention.

A display area in the image managing screen 1 can be divided into a first display area 2 and a second display area 3. Further, in the first display area 2 are provided a period display area 5, a "my favorite" area display button 6, a mode setting dialog display button 7 and a period display switching bar 8. Furthermore, in the second display area 3 are provided an image display area 11, a view switching bar 12 and an end button 13.

Information which is used to select a date is displayed as a time-series tree structure in the period display area 5. The "my favorite" area display button 6 is an operation button which is used to display a "my favorite" area (not shown) in the first display area 2. The mode setting dialog display button 7 is an operation button which is used to display an operation mode setting dialog of a drag and drop operation (which will be described later). The period display switching bar 8 is an operation bar which is used to switch a period displayed in the period display area 5 in units of "year", "month" and "day". It is to be noted that a scroll bar 9 is displayed in the period display area 5 when an entire period cannot be displayed in one screen.

Reduced images belonging to a period selected in the period display area 5 are displayed in a calendar or thumbnail form in the image display area 11. The view switching bar 12 can be used to select whether calendar display or thumbnail display is effected. The end button 13 is an operation button which is used to terminate display of the image managing screen 1. It is to be noted that a scroll bar 14 is displayed in the image display area 11 when all reduced images cannot be displayed in one screen.

Figure 2:
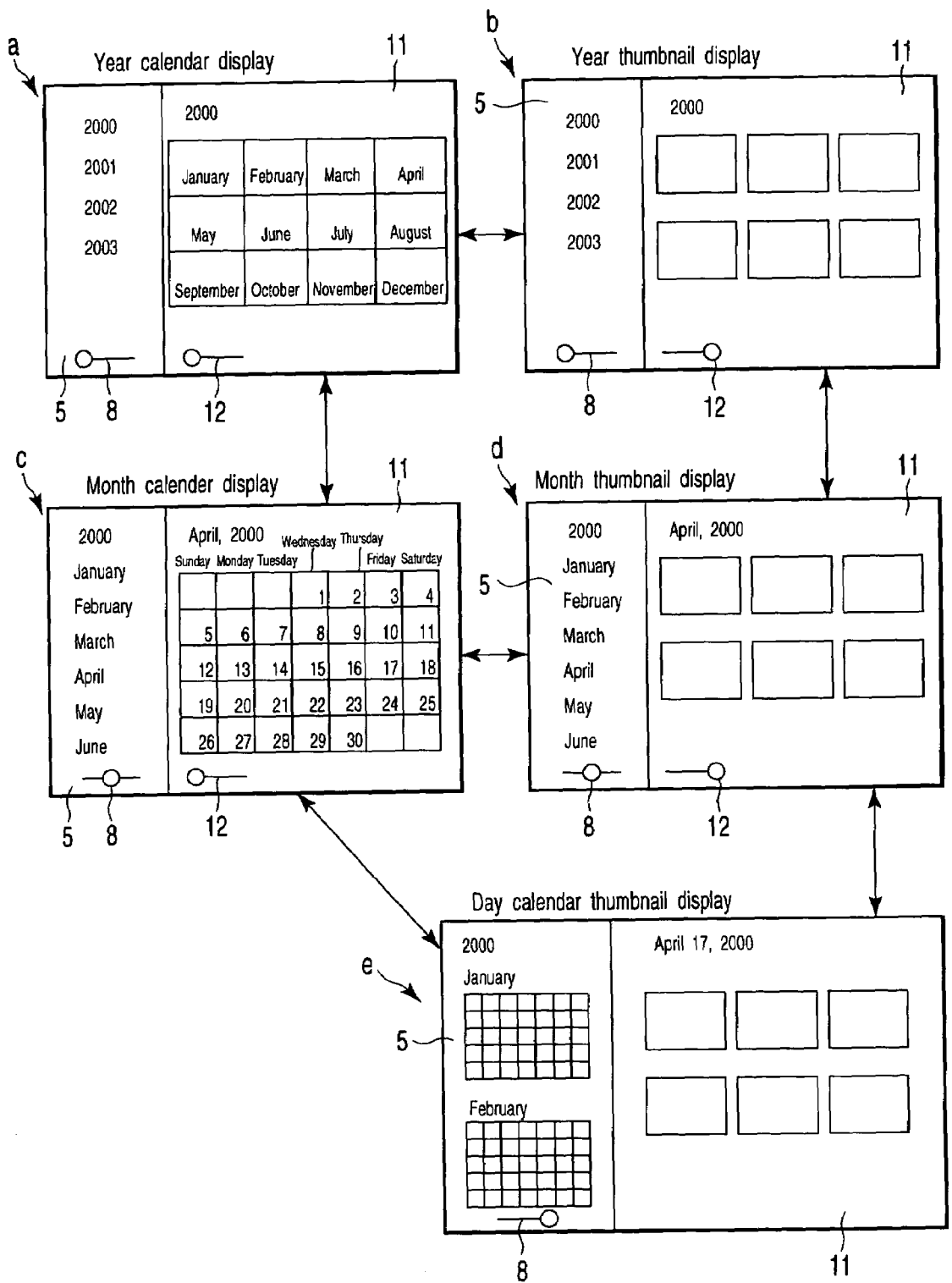
FIG. 2 is pattern views showing display conformations of the image managing screen and display switching thereof.

FIG. 2 is pattern views showing display conformations of the image managing screen 1 and display switching thereof.

A screen a in FIG. 2 shows the image managing screen 1 when the period display area 5 displays information in units of "year" and the image display area 11 displays a calendar. A typical image of a month, e.g., an image captured at the beginning of that month is displayed as a reduced image in a frame of each month of this calendar display.

A screen b in FIG. 2 shows the image managing screen 1 when the period display area 5 performs "year" display, and the image display area 11 effects thumbnail display. All images having a date in a selected "year" are displayed as thumbnail images in the image display area 11. Switching between the screen a in FIG. 2 and the screen b in FIG. 2 is carried out by operating the view switching bar 12.

A screen c in FIG. 2 shows the image managing screen 1 when the period display area 5 performs "month" display, and the image display area 11 effects calendar display. A typical image of a day, e.g., an image captured at the beginning of that day is displayed as a reduced image in a frame of each day in this calendar display. Switching between the screen a in FIG. 2 and the screen c in FIG. 2 is carried out by operating the period display switching bar 8 or clicking a reduced image in the view screen.

A screen d in FIG. 2 shows the image managing screen 1 when the period display area 5 performs "month" display and the image display area 11 effects thumbnail display. All images having a date of selected "year/month" are displayed as thumbnail images in the image display area 11. Switching between the screen c in FIG. 2 and the screen d in FIG. 2 is executed by operating the view switching bar 12. Moreover, switching between the screen b in FIG. 2 and the screen d in FIG. 2 is carried out by operating the period display switching bar 8.

A screen e in FIG. 2 shows the image managing screen 1 when the period display area 5 performs "day" display and the image display area 11 effects thumbnail display. All images having a date of selected "year/month/day" are displayed as thumbnail images in the image display area 11. Switching between the screen c in FIG. 2 and the screen e in FIG. 2 is carried out by operating the period display switching bar 8 or clicking a reduced image in the view screen. Additionally, switching between the screen d in FIG. 2 and the screen e in FIG. 2 is also performed by operating the period display switching bar 8.

Figure 3:
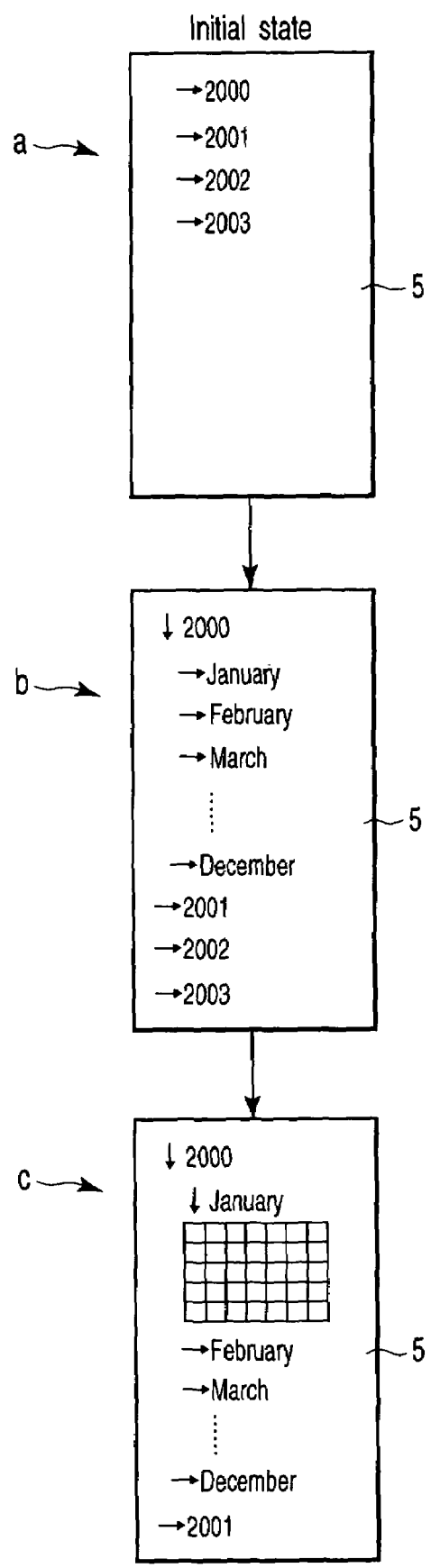
FIG. 3 is a view showing transitions of period display of a period display area.

It is to be noted that a period to be displayed in the period display area 5 can be switched without operating the period display switching bar 8. FIG. 3 is a view showing transitions of period display of the period display area 5.

A screen a in FIG. 3 shows an initial state, and "years" are displayed. For example, when "→" provided on the left-hand side of the year "2000" is clicked, a configuration of a layer below, i.e., "months" are displayed as shown in a screen b in FIG. 3. In this example, the arrow provided on the left-hand side of the year "2000" is changed into "↓". Further, for example, when "→" provided on the left-hand side of "January" is clicked, "days" are displayed as shown in a screen c of FIG. 3.

An alignment operation of the period display area 5 and the image display area 11 will now be described.

Figure 4:
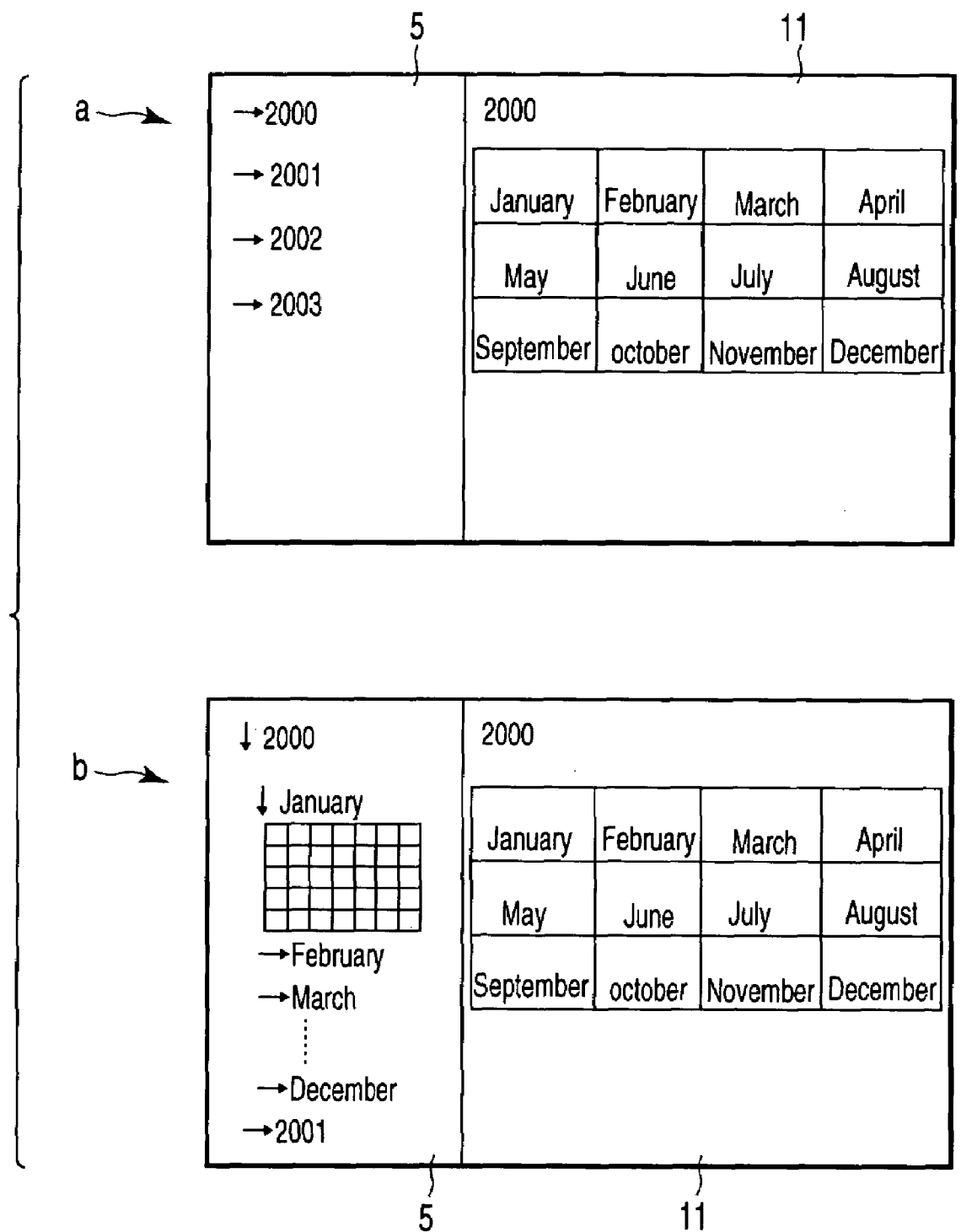
FIG. 4 is a view showing an alignment operation of the period display area and an image display area.

When a period displayed in the period display area 5 is selected, reduced images can be displayed in the image display area 11 as information having the selected year/month/day. As shown in a screen a in FIG. 4, for example, when a character part of the year "2000" is clicked, the image display area 11 performs calendar display concerning the year 2000. It is to be noted that display in the period display area 5 can be changed without changing display in the image display area 11 as shown in a screen b in FIG. 4 by clicking "→" provided on the left-hand side of the year "2000".

Furthermore, a plurality of periods displayed in the period display area 5 can be selected. As shown in FIG. 5, when the year 2000 and the year 2001 are selected, information concerning the two selected years are displayed in the image display area 11. In this example, as a method of selecting a plurality of periods, a known operation can be used. For example, a plurality of periods can be selected while pushing a "shift" key, or a range including a plurality of periods can be specified by surrounding the range by a drag operation using a mouse.

A drag and drop operation which is one function of this image managing method will now be described. The drag and drop operation is an operation which gives year/month/day to an image by a simple method. When one or more images which are targets of date change are dragged and dropped on displayed year/month/day in the period display area 5, that date can be set to the images. Moreover, when the images are dropped on an area other than the displayed year/month/day in the period display area 5, those images can be saved.

FIG. 6 is a view collectively showing the drag and drop operations. A vertical axis in FIG. 6 shows a year, a month and a day which are targets of the drop operation, and a horizontal axis of the same shows whether the number of images to be dragged is one or above. Additionally, since the operation differs depending on each rewrite mode if a plurality of images are targets, operations are classified and displayed in each mode. The rewrite mode includes an identical rewrite mode and a difference rewrite mode. The contents of these modes will be described later in detail.

FIG. 7 is a view showing an operation of dropping a single image on the displayed year/month/day in the period display area 5. For example, an area 20 in which an image which is a target of date change is saved is opened, and an image A is dropped on a display string of Jan. 17, 2000 in the period display area 5. Then, the date of the image A is changed from Apr. 23, 2000, 13:30 to Jan. 17, 2000, 13:30 and the image is saved in this state.

It is to be noted that the date of the image A is changed from Apr. 23, 2000, 13:30 to Apr. 23, 2002, 13:30 and the image is saved in this state when the image A is dropped on a display string of the year 2002 in the period display area 5. Further, when the image A is dropped on a display string of May, 2003 in the period display area 5, a date of the image A is changed from Apr. 23, 2000, 13:20 to May 23, 2003, 13:30 and the image is saved in this state.

FIG. 8 is a view illustrating an operation of dropping a plurality of images on a display string of year/month/day in the period display area 5. For example, an area 20 in which images which are target of date change are saved is opened, and images A, B and C are dropped on a display string of Jan. 17, 2001 in the period display area 5. Then, in the identical rewrite mode, dates of all the dropped images are changed to the same date and these images are saved in this state. That is, a date of the image A is changed from Apr. 13, 2004, 13:25 to Jan. 17, 2001, 13:25 and the image is saved in this state. A date of the image B is changed from Apr. 15, 2002, 15:33 to Jan. 17, 2001, 15:33 and the image is saved in this state. A date of the image C is changed from Apr. 23, 2000, 6:20 to Jan. 17, 2001, 6:20 and the image is saved in this state.

It is to be noted that dropping the images on a year display string changes the "year" in each date of the images A, B and C and the images are saved. Furthermore, when the images are dropped on a month display string, the "year" and the "month" in each date of the images A, B and C are changed, and the images are saved.

Figure 9:
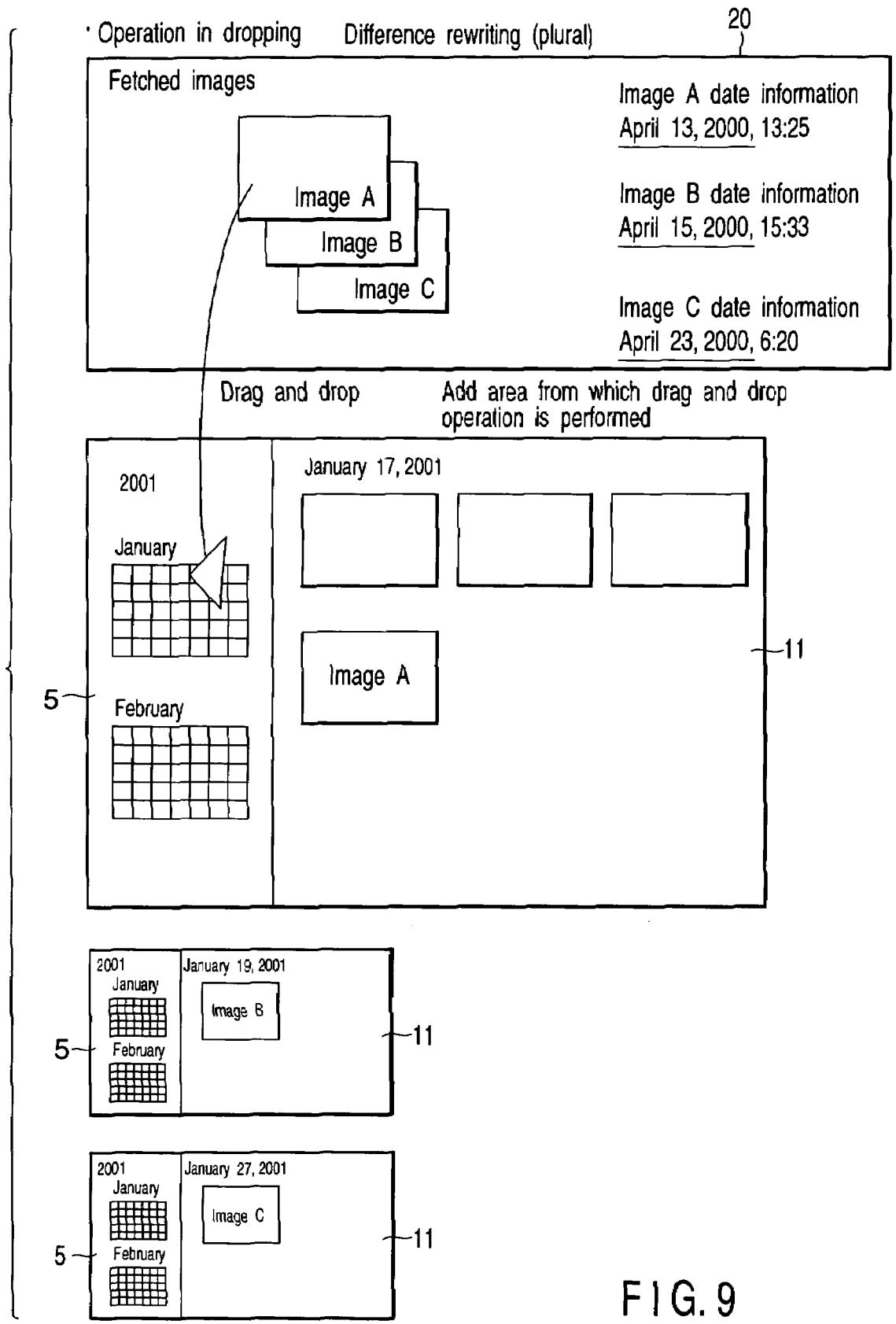
FIG. 9 is a view illustrating a difference rewrite mode.

FIG. 9 is a view illustrating an operation of dropping a plurality of images on a display string of year/month/day in the period display area 5 in the difference rewrite mode. For example, the area 20 where images which are targets of date change are saved is opened, and images A, B and C are dropped on a display string of Jan. 17, 2001 in the period display area 5. Then, in the difference rewrite mode, a difference is calculated from date information of the dropped first image, dates of the other images are changed, and the images are saved in a file having a corresponding date.

That is, a date of the image A is changed from Apr. 13, 2000, 13:25 to Jan. 17, 2001, 13:25 and the image is saved in this state. A date of the image B is changed from Apr. 15, 2000, 15:33 to Jan. 19, 2001, 15:33 and the image is saved in this state. A date of the image C is changed from Apr. 23, 2000, 6:20 to Jan. 27, 2001, 6:20 and the image is saved in this state.

It is to be noted that dropping the images on a year display string changes the "year" in each date of the images A, B and C, and the images are saved. Moreover, dropping the images on a month display string changes the "year" and the "month" in each date of the images A, B and C, and the images are saved.

Figure 10:
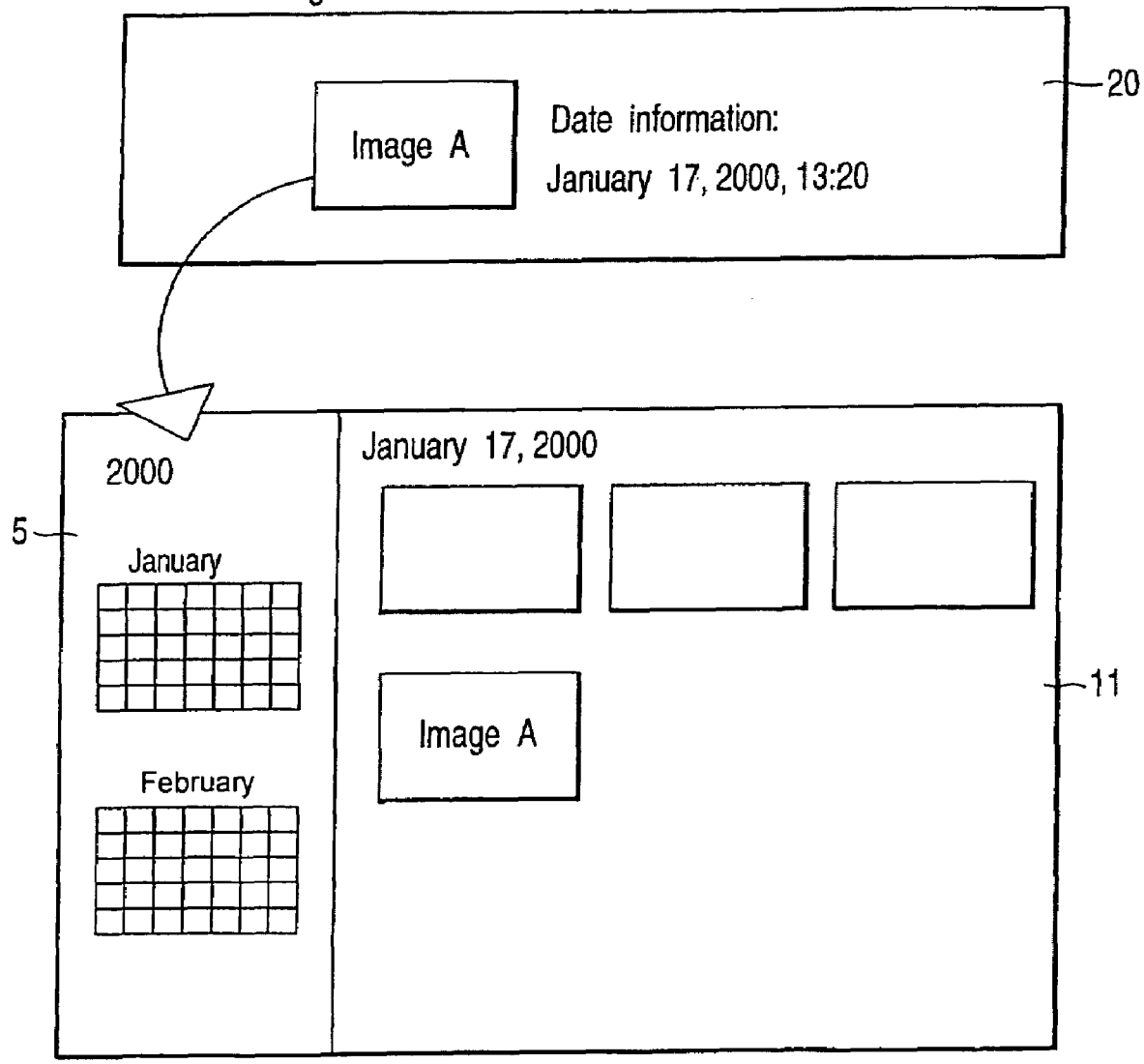
FIG. 10 is a view illustrating an operation of dropping an image on a part other than a date display string in the period display area.

FIG. 10 is a view illustrating an operation of dropping one or more images on a part other than the year/month/day display string in the period display area 5. For example, an area 20 in which an image is saved is opened, and an image A is dropped on a part other than the date display string in the period display area 5. Then, the image A is saved in a folder having a date of Jan. 17, 2000 based on a date of the image A, i.e., Jan. 17, 2000, 13:30.

A description will now be given as to a configuration of the image managing apparatus which realizes the above-described image managing method and a main processing procedure thereof.

Figure 11:
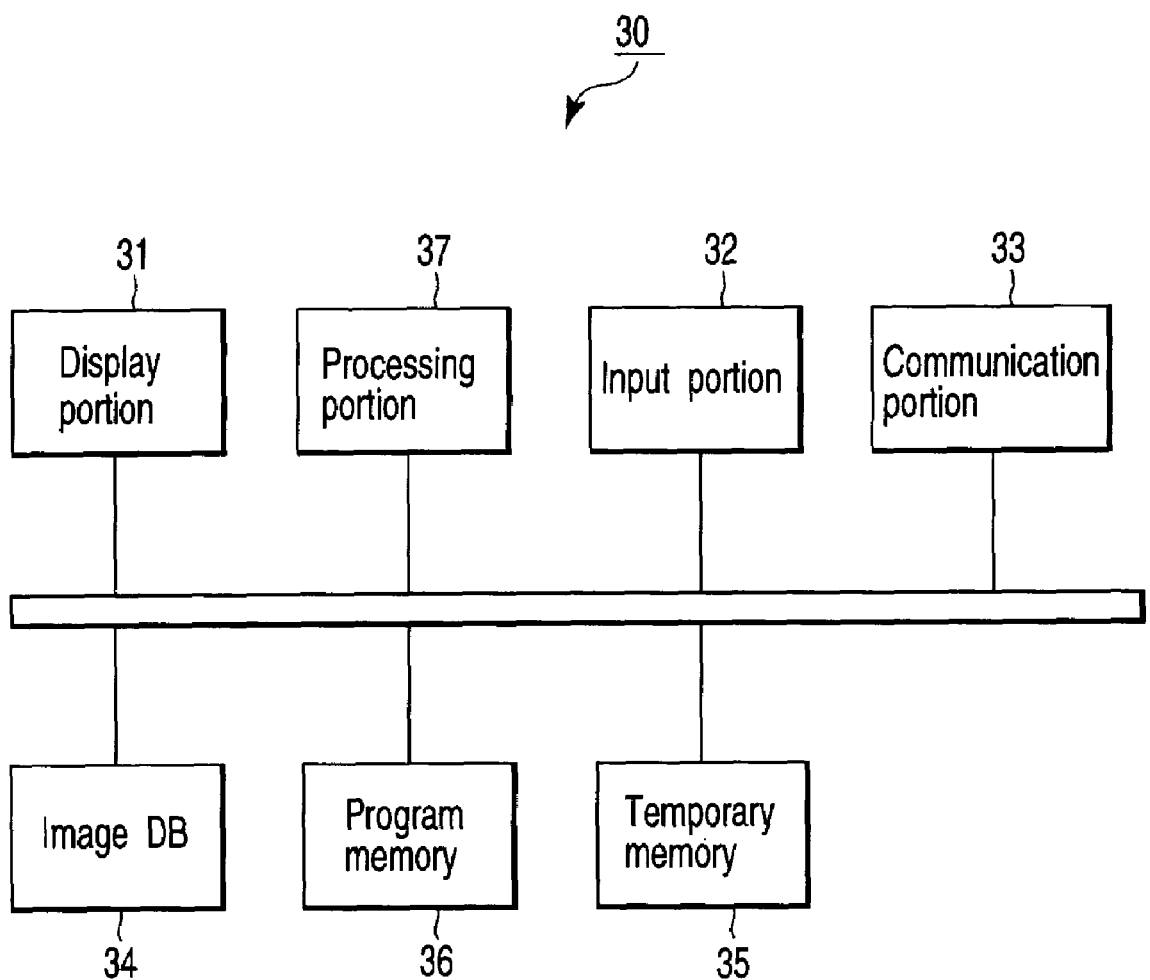
FIG. 11 is a view showing a configuration of an image managing apparatus.

FIG. 11 is a view showing a configuration of an image managing apparatus 30. The image managing apparatus 30 comprises a display portion 31, an input portion 32, a communication portion 33, an image DB 34, a temporary memory 35, a program memory 36 and a processing portion 37.

The display portion 31 is a CRT or TFT liquid crystal display which displays an image managing screen. The input portion 32 is an input device such as a keyboard or a mouse which receives an operation instruction input from a user.

The communication portion 33 is an interface which transmits/receives information such as an image file with an external device (not shown) such as a digital camera through communication. The image DB 34 is a storage medium which stores image data. The temporary memory 35 is a buffer memory which temporarily stores information required for image managing processing. The program memory 36 saves a program which controls each function of the image managing apparatus 30. The processing portion 37 entirely controls operations of the image managing apparatus 30.

A general procedure of the image managing processing will now be described with reference to FIG. 12. It is to be noted that the following processing is processing concerning main functions in image managing processing functions. Therefore, even in case of functions which are not described below, the functions described in connection with FIGS. 1 to 10 are included in the image managing processing functions.

Figure 12:
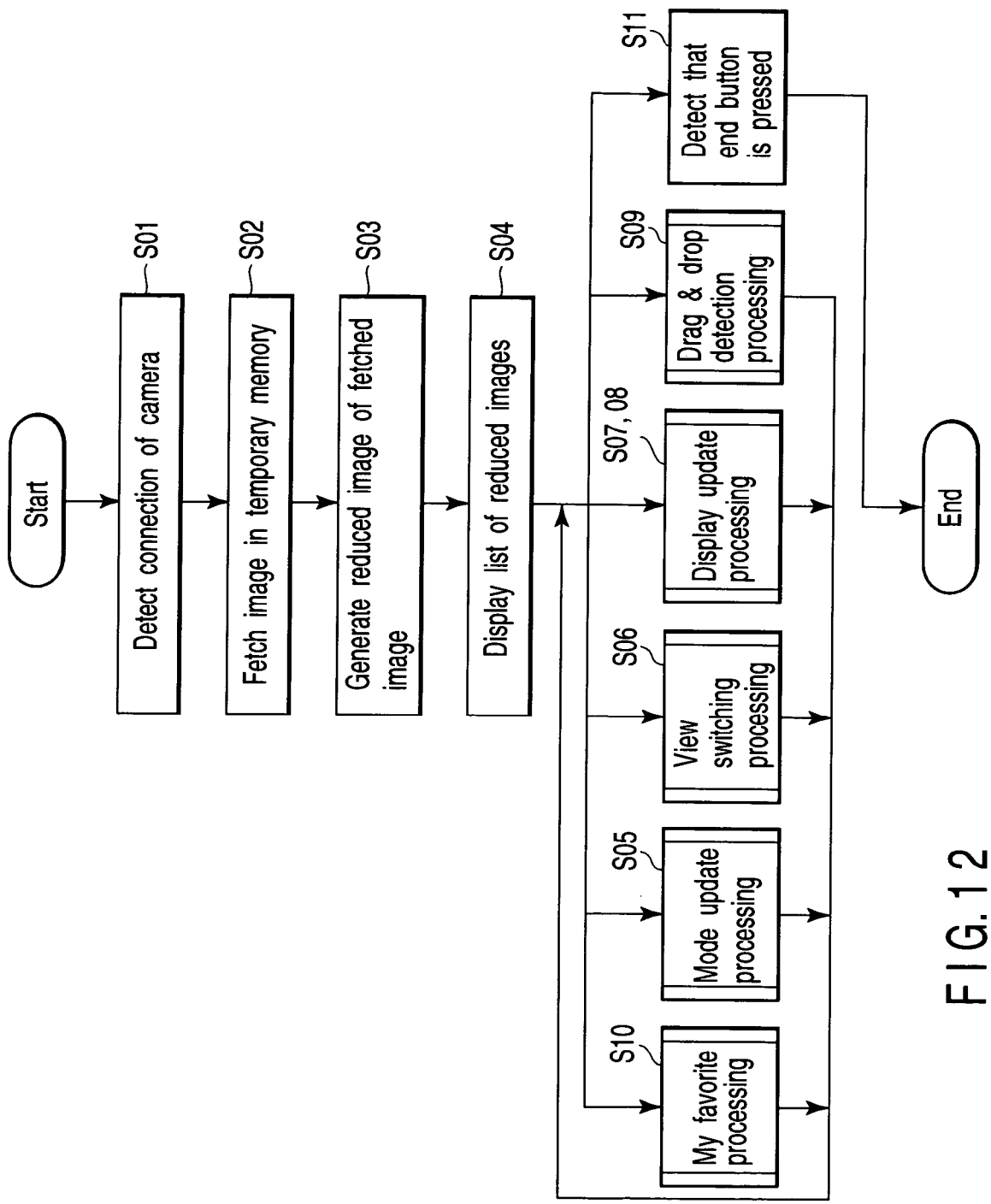
FIG. 12 is a flowchart showing a general procedure of image managing processing.

At steps S01 to S02 in FIG. 12, when the processing portion 37 detects that a camera is connected with the managing apparatus 30, it receives captured images through the communication portion 33 and saves these images in the temporary memory 35. Then, at steps S03 to S04, reduced images of the fetched images are generated, and an image managing screen 1 is displayed in the display portion 31 together with a list of the reduced images.

With the above-described preparation, each processing corresponding to an operation by a user is executed.

When a user operates the mode setting dialog display button 7 in the image managing screen 1, mode update processing (FIG. 13) at a step S05 is executed.

Figure 13:
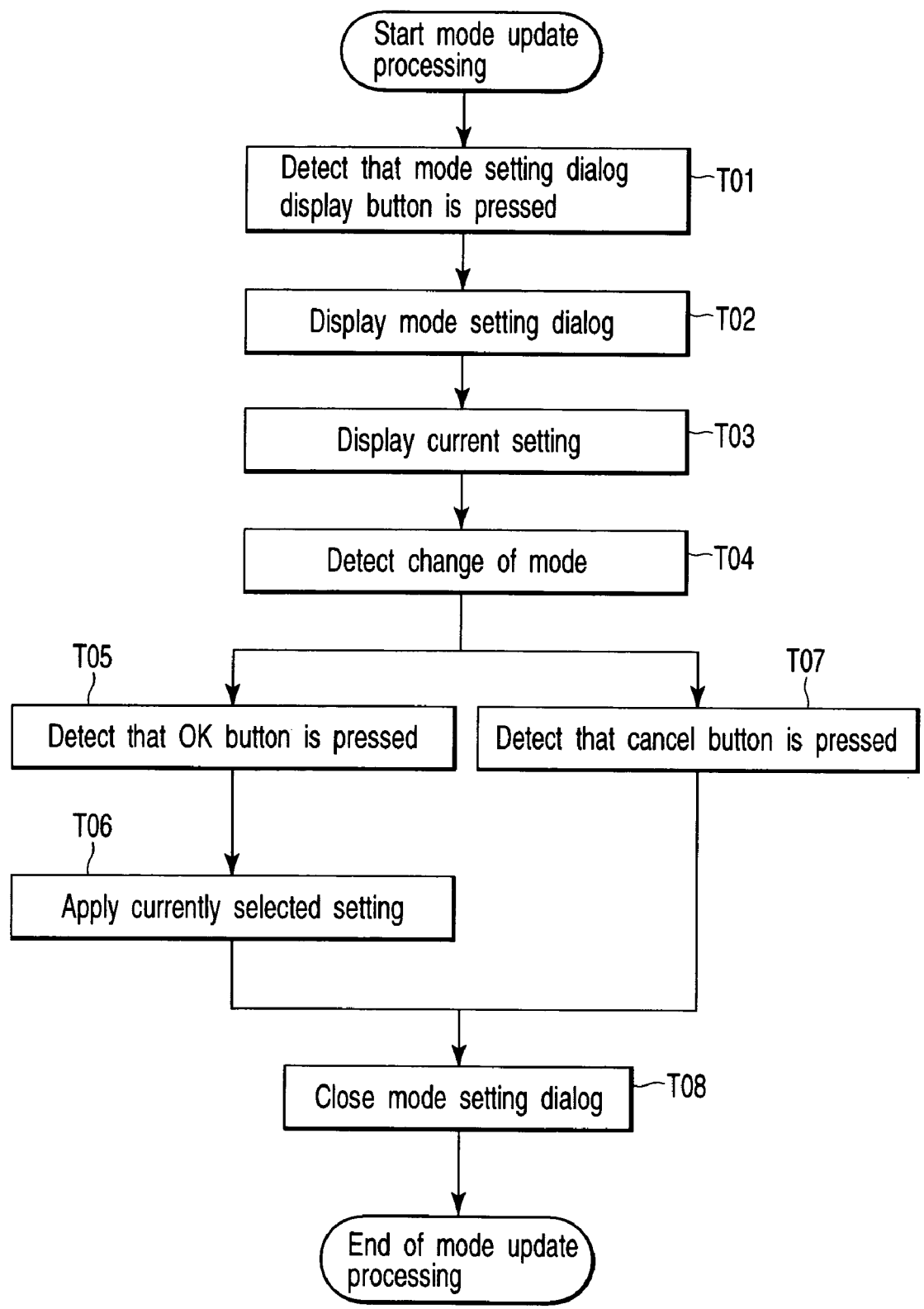
FIG. 13 is a flowchart showing a mode update processing procedure.
Figure 14:
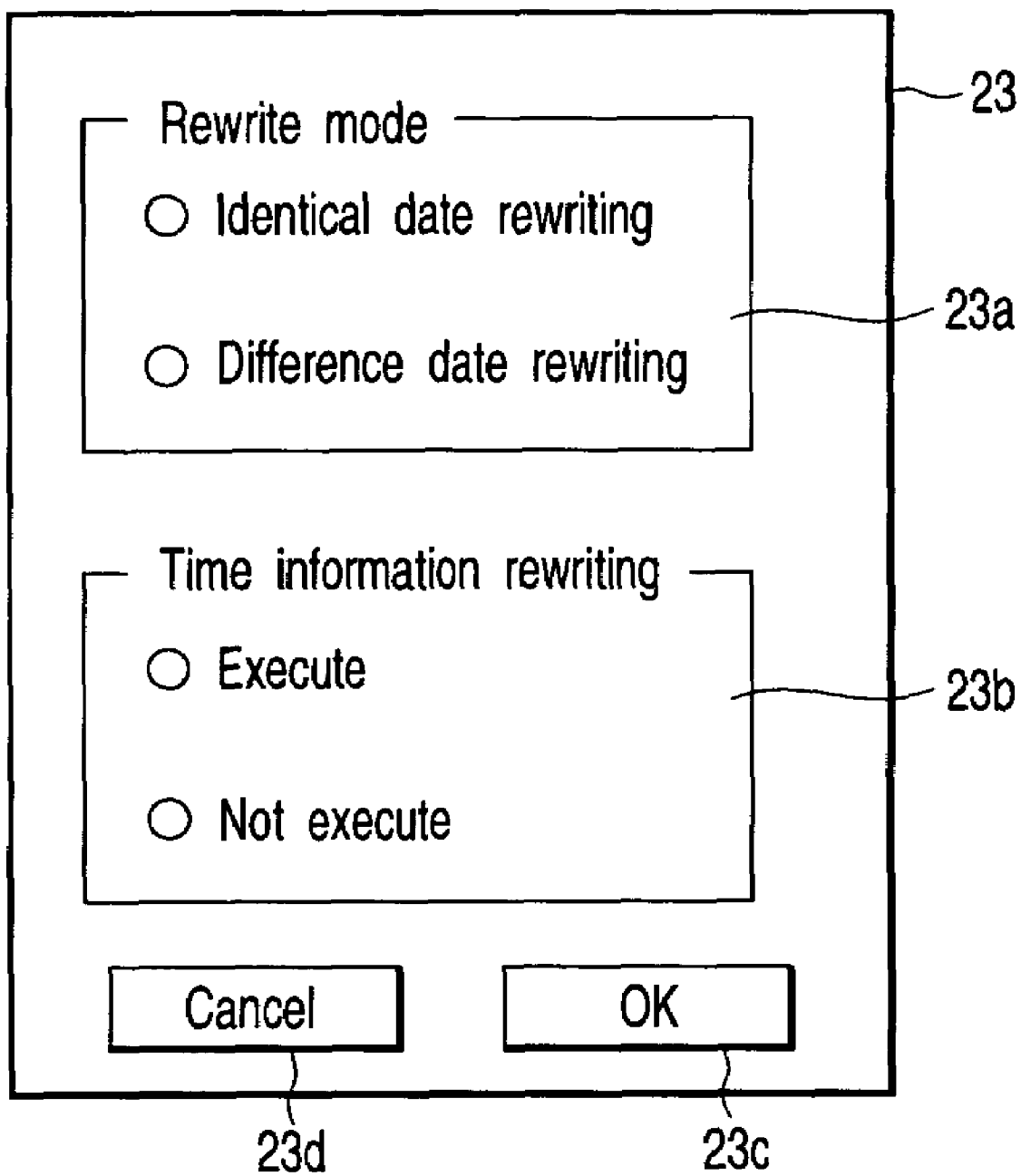
FIG. 14 is a view showing a mode setting dialog.

At steps T01 to T03 in FIG. 13, when it is detected that the mode setting dialog display button 7 is operated, a mode setting dialog shown in FIG. 14 is displayed. A rewrite mode setting column 23a, a time information rewrite column 23b, an OK button 23c and a cancel button 23d are provided in the mode setting dialog 23.

In this mode setting dialog 23, modes concerning the drag and drop operation can be set. One of such modes is a rewrite mode when a plurality of images are dragged and dropped, and one of an identical date rewrite mode and a difference date rewrite mode can be selected. The remaining modes are modes which select whether a dialog required to change time information is displayed after the drag and drop operation is effected. It is to be noted that a current mode setting content is displayed as initial values in this mode setting dialog.

When a user selects a mode and operates the OK button 23c, a change of mode is detected and application of the set mode is enabled at steps T04 to T06 in FIG. 13. Then, at a step T08, the mode setting dialog 23 is closed in order to return to the main routine. When a user operates the cancel button 23d, the mode setting dialog 23 is closed in order to return to the main routine at steps T07 to T08 in FIG. 18.

Again referring to FIG. 12, when a user operates the view switching bar 12 in the image managing screen 1, view switching processing (FIG. 15) at a step S06 is executed.

Figure 15:
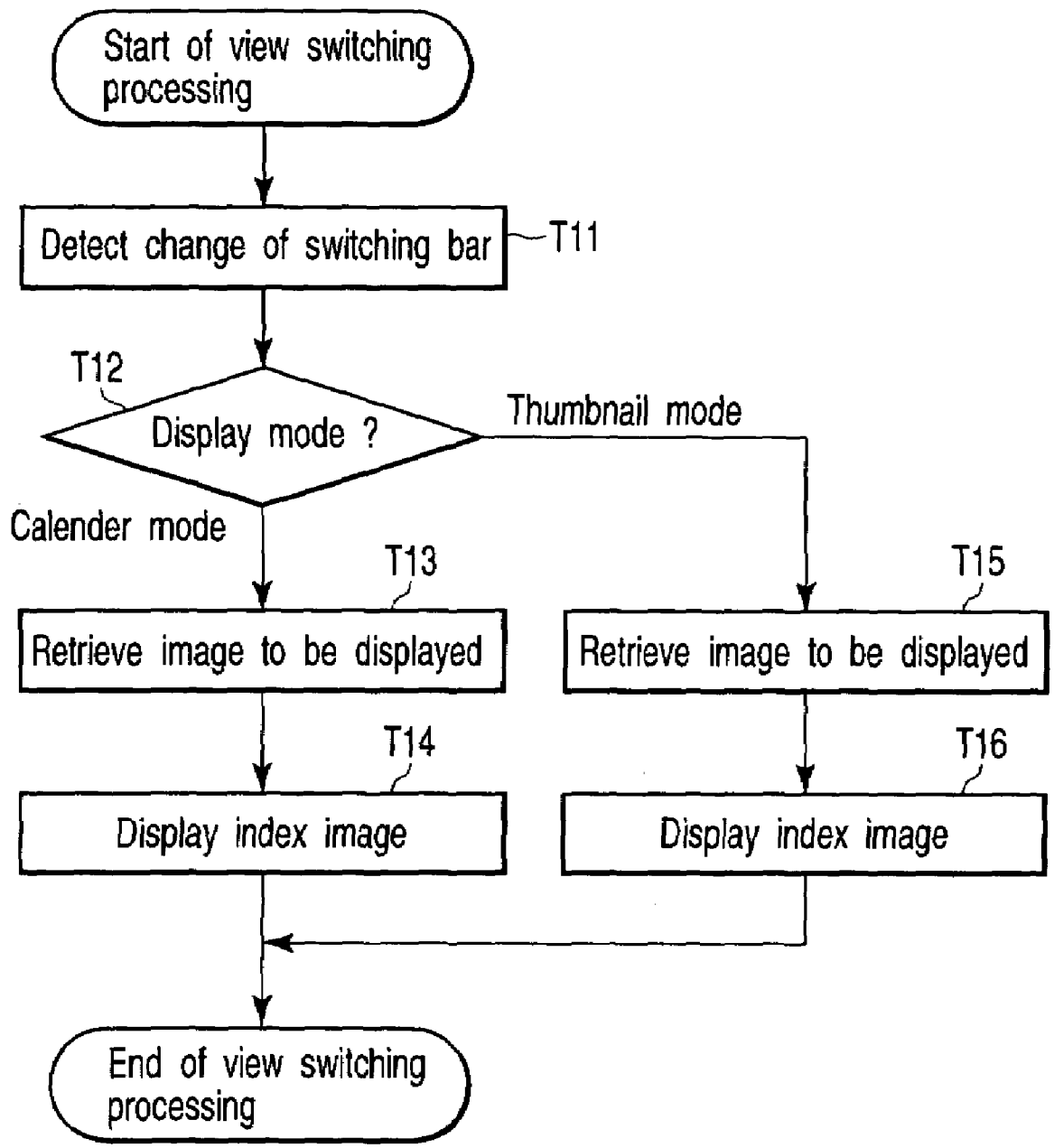
FIG. 15 is a flowchart showing a view switching processing procedure.

At steps T11 to T12 in FIG. 15, a change in view switching bar 12 is detected, and which display mode is selected is checked. Then, if the display mode is a calendar mode, images displayed in the image display portion 11 are retrieved, these images are associated with the calendar, and index images are embedded and displayed in the calendar at steps T13 to T14. Incidentally, if a plurality of images correspond to the same date, an index image of an image having the earliest date is displayed to return to the main routine. If the display mode is a thumbnail mode, not only images displayed in the image display portion 11 but all images associated with the displayed calendar are retrieved at T15 to T16. Then, index images of these images are displayed to return to the main routine.

Again referring to FIG. 12, when a user operates the year/month/day in the period display area 5 in the image managing screen 1, display update processing A (FIG. 16) at a step S07 is executed. At a step T20 in FIG. 16, period selection processing (FIG. 17) is executed.

Figure 17:
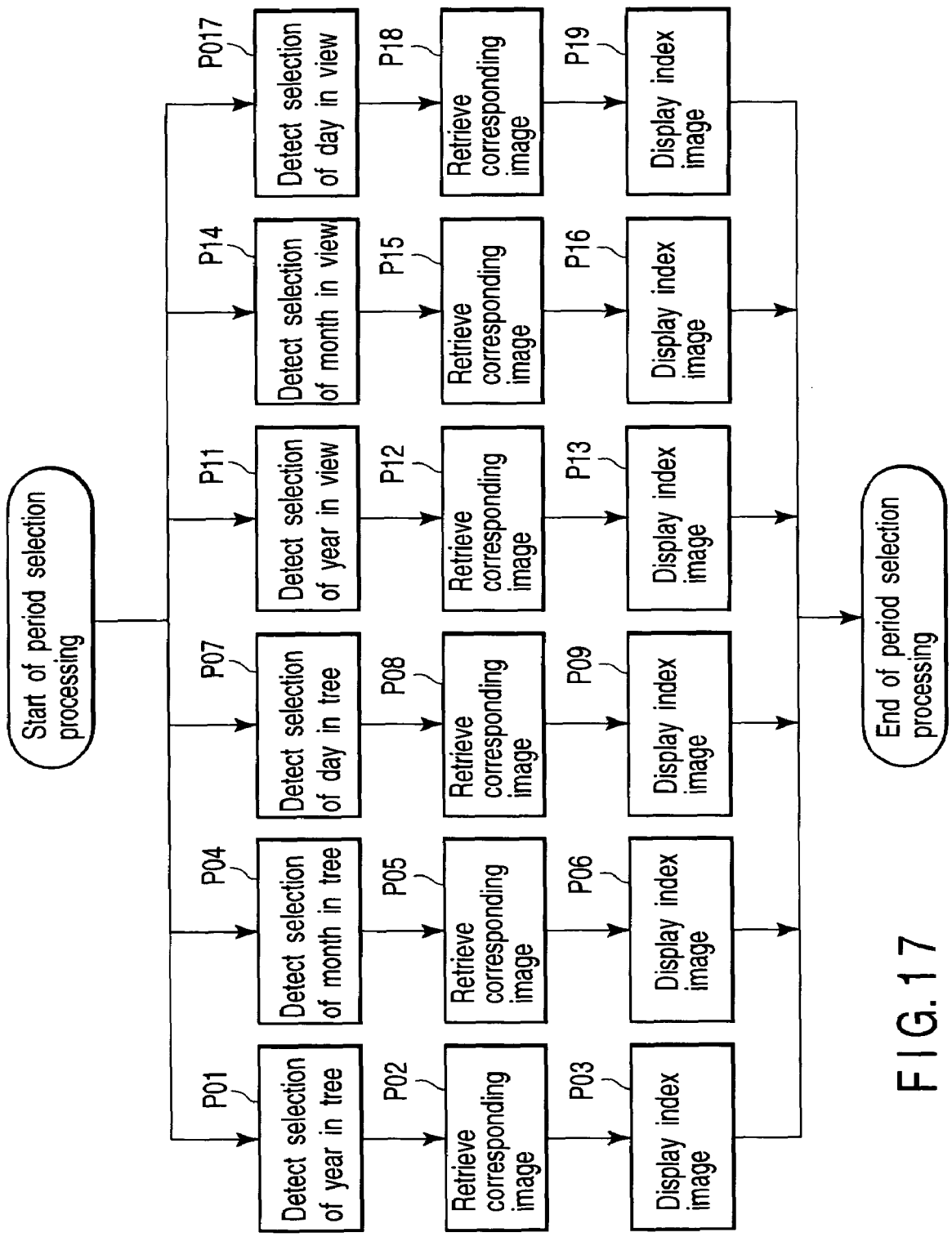
FIG. 17 is a flowchart showing a period selection processing procedure.

When a "year" in a time-series tree in the period display area 5 is selected, images included in the selected year are retrieved from the image DB 34, and index images of these images are displayed in accordance with the calendar display mode or the thumbnail display mode, and the control returns to the display update processing A at steps P01 to P03 in FIG. 17.

When a "month" in the time-series tree in the period display area 5 is selected, images included in the selected month and year are retrieved from the image DB 34, and index images of these images are displayed in accordance with the display mode, and the control returns to the display update processing A at steps P04 to P06 in FIG. 17.

When a "day" in the time-series tree in the period display area 5 is selected, images included in the selected year/month/day are retrieved from the image DB 34, index images of these images are displayed in accordance with the display mode, and the control returns to the display update processing A at steps P07 to P09 in FIG. 17.

At a step T21 in FIG. 16, display of the time-series tree displayed in the period display portion 5 is changed to display of a unit period which is just above the unit displayed in the image display portion 11. For example, when index images are displayed in the image display portion 11 in units of day, the time-series tree displayed in the period display portion 5 is changed to display images in units of year, month and day. Then, the display update processing A is terminated.

Variation processing of the display update processing will now be described. This processing is processing corresponding to display transitions of the time-series tree shown in FIG. 3. When a user operates an "arrow" icon in the period display area 5 in the image managing screen 1, display update processing B (FIG. 18) at a step S08 is executed.

Figure 18:
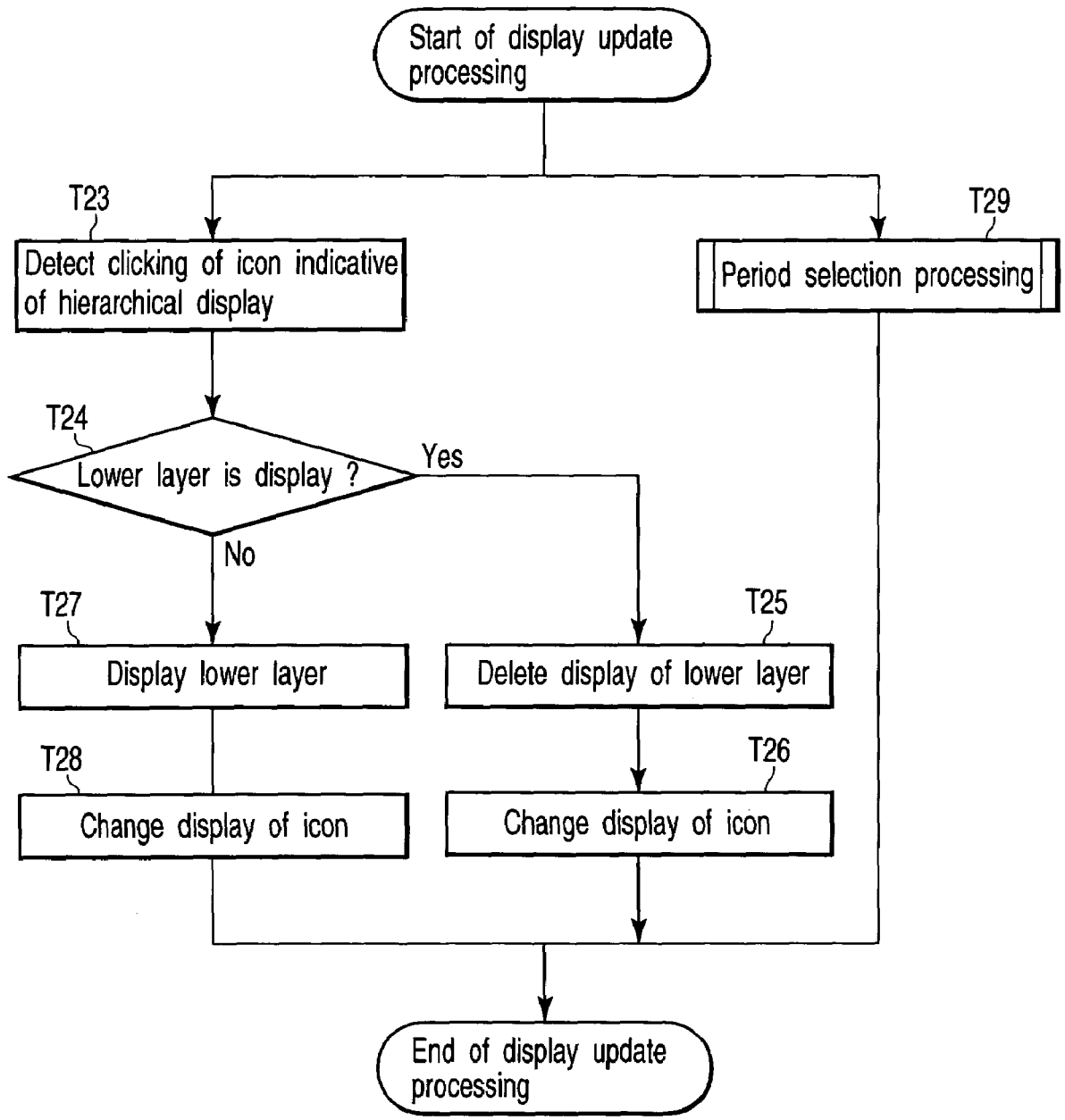
FIG. 18 is a flowchart showing a generation procedure of display update processing.

At steps T23 to T24 in FIG. 18, when it is detected that an arrow icon indicative of hierarchical display is operated, whether a lower layer has been already displayed is checked. That is, if a selected icon is "→", the lower layer is not displayed. If the selected icon is "↓", the lower layer has been already displayed.

Thus, when the lower layer has been already displayed, display of the lower layer is erased, the arrow icon is changed to "→", and the control returns to the main routine at steps T25 to T26. On the other hand, when the lower layer is not displayed, the lower layer is displayed, the arrow icon is changed to "↓", and the control returns to the main routine at steps T27 to T28.

It is to be noted that, if a user operates the year/month/day in the period display area 5 in the image managing screen 1, period selection processing (FIG. 17) at a step T29 in FIG. 18 is executed, but this processing is the same as the above-described processing, thereby eliminating the detailed explanation.

Again referring to FIG. 12, when a user drags an image from a list of reduced images displayed in the display portion 31 and drops this image in the period display area 5 in the image managing screen 1, drag and drop processing (FIG. 19) at a step S09 is executed. It is to be noted that an image to be dragged is not restricted to an image read from an external device, and it may be an image stored in the image DB 34 or an image displayed in the image display portion 11.

Figure 19:
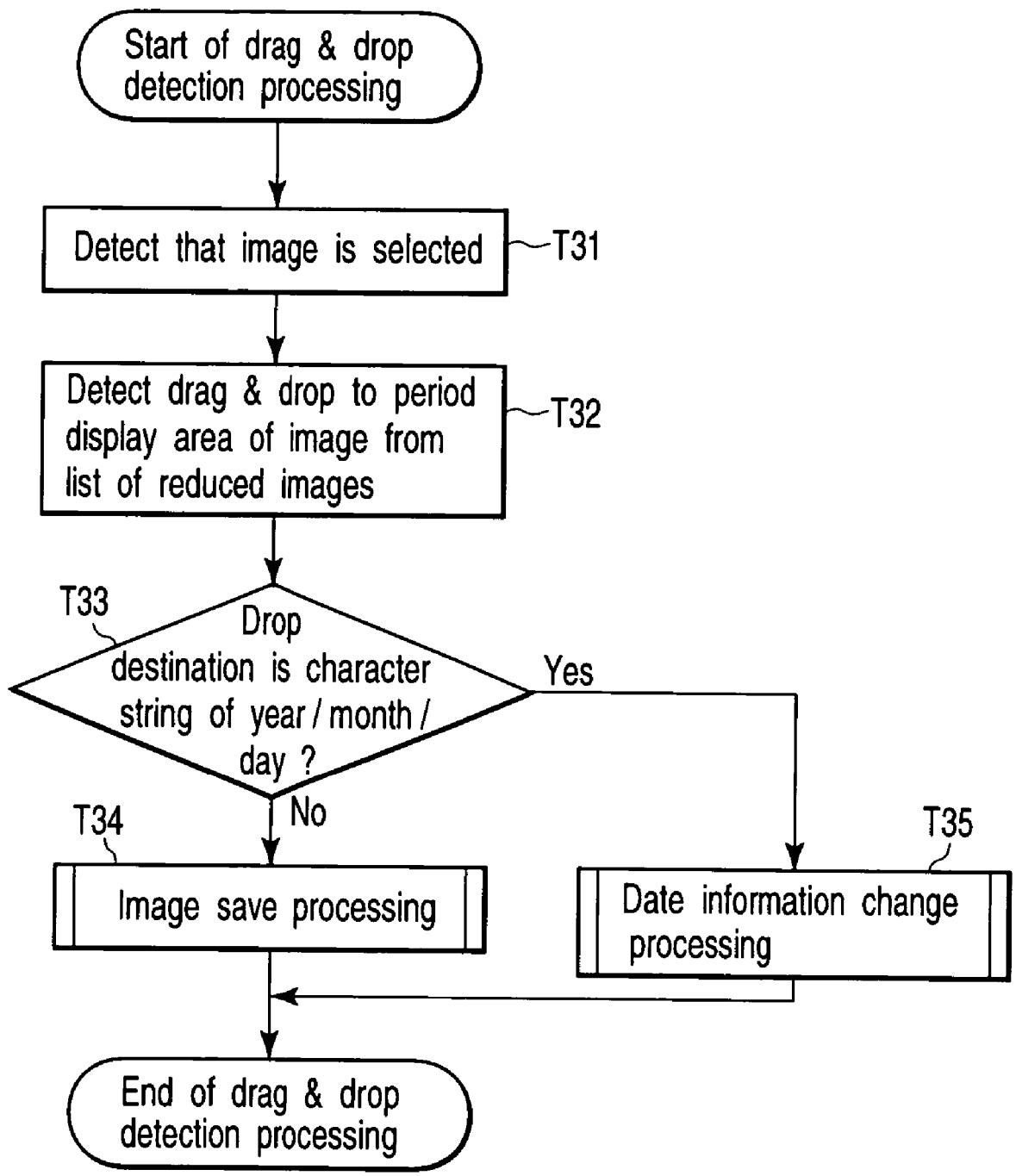
FIG. 19 is a flowchart showing a drag and drop processing procedure.

At steps T31 to T32 in FIG. 19, a dragged image is specified, and a position in the period display area 5 to which this image is dropped is detected. At a step T33, if a destination of the drop operation is not a character string of the year/month/day, image save processing (FIG. 20) is executed at a step T34.

Figure 20:
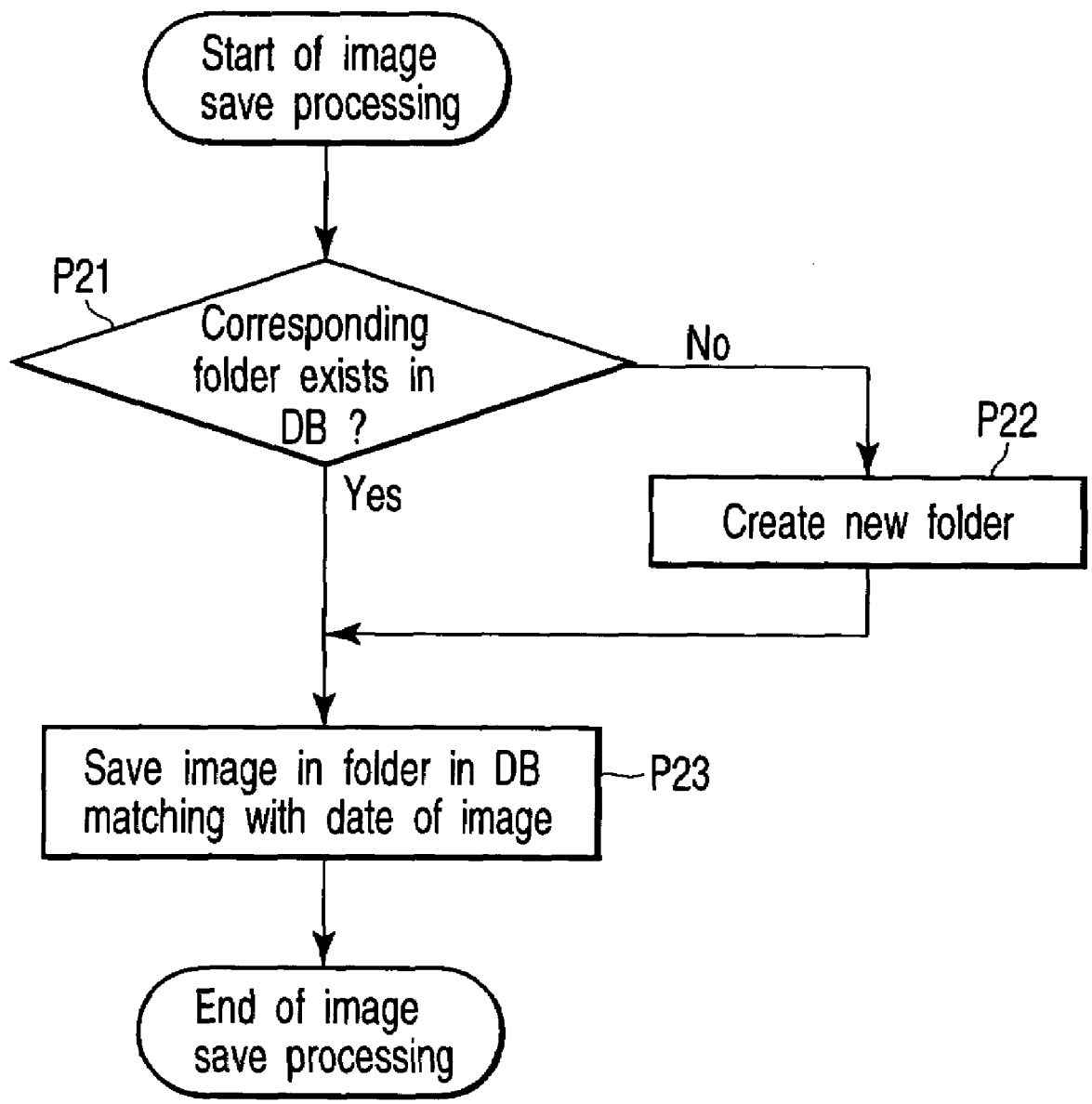
FIG. 20 is a flowchart showing an image save processing procedure.

At a step P21 in FIG. 20, it is checked whether a folder corresponding to a date of the dropped image exists or not in the image DB 34. If this folder does not exists, a folder corresponding to this date is newly crated at a step P22. Then, at a step P23, the image is saved in the folder corresponding to the date of this image, and the control returns to the image save processing.

At a step T33 in FIG. 19, if a destination of the drop operation is a character string of the year/month/day, date information change processing (FIG. 21) is executed at a step T35.

Figure 21:
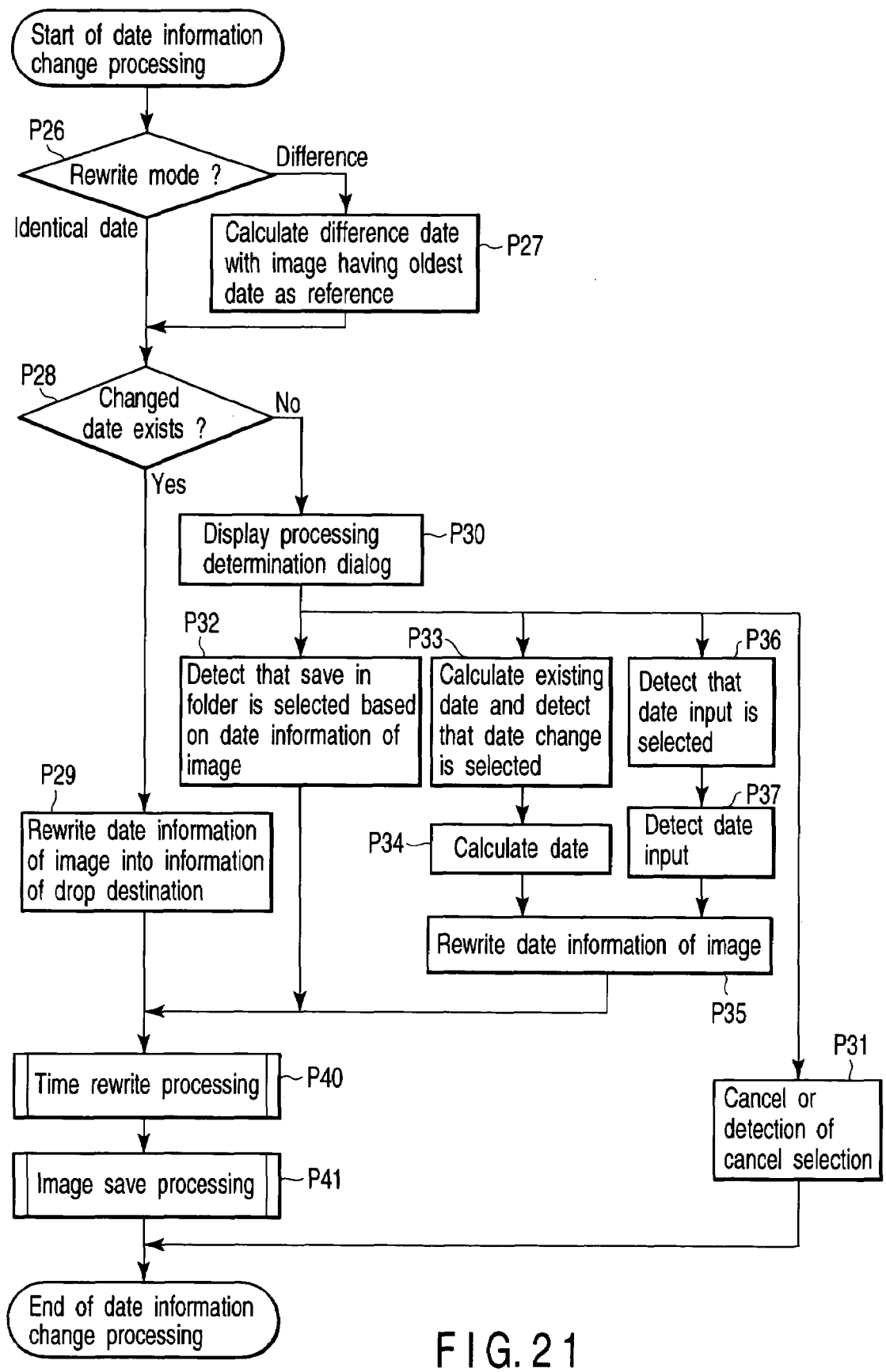
FIG. 21 is a flowchart showing a date information change processing procedure.

At a step P26 in FIG. 21, which one of the "identical date rewrite mode" and the "difference date rewrite mode" the rewrite mode is set to is checked. This mode is a mode set in the mode change processing shown in FIG. 13. Additionally, if the rewrite mode is set to the "difference date rewrite mode", a difference date is calculated for each image with the oldest date of the dragged images being used as a reference.

At a step P28, whether a new date determined based on date information of a destination of the drop operation is an existing date. For example, if an image having a date of August 31 is dropped on a character string of January, a new date is January 31, and this date exists. However, if this image is dropped on a character string of February, a new date is February 31, and this date does not exist.

Thus, if a changed date exists, date information of a dragged image is rewritten into date information of a destination of the drop operation at a step P29. On the other hand, if a changed date does not exist, a dialog for processing determination is displayed at a step P30, and a determination by a user is waited.

Figure 22:
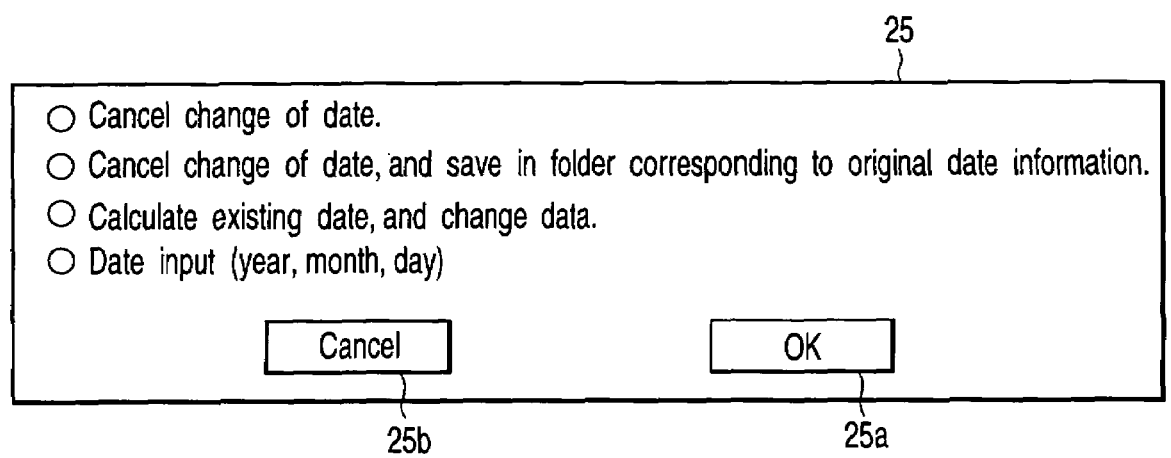
FIG. 22 is a view showing a processing determination dialog.

FIG. 22 is a view showing a processing determination dialog. A user can select subsequent processing from this processing determination dialog.

At a step P31, when "cancel change of date" is selected and the OK button 25a is operated, or when the cancel button 25b is operated, the change of a date is canceled, and the control returns to the state before the drag operation.

At a step P32, when "cancel change of date, and save in folder corresponding to original date information" is selected, the change of a date is canceled, but an image is saved in a folder corresponding to the original date by making reference to the original date information. Therefore, the control advances to a next step S40 in order to execute this save processing.

At steps P33 to P35, when "calculate existing date, and change date" is selected, a current date is changed to an existing date. Since a date which does not exist is a date which is beyond a normal date, excess days are calculated, and the date is changed based on a result of this calculation. For example, when an image of Mar. 31, 2004 is dropped to April, 2004 and its date becomes Apr. 31, 2004, the date is changed to May 1, 2004 since an excess amount is one day, and the control proceeds to a next step P40.

Further, a user can specify a date to be changed by directly inputting numeric values in "date input". This date input column shows a date of an image as an initial value. When a user inputs a date, the input date is detected at steps P36 to P37, and date information of the image is rewritten at a step P35. Then, the control advances to a next step P40.

At the step P40, time rewrite processing (FIG. 23) is executed.

Figure 23:
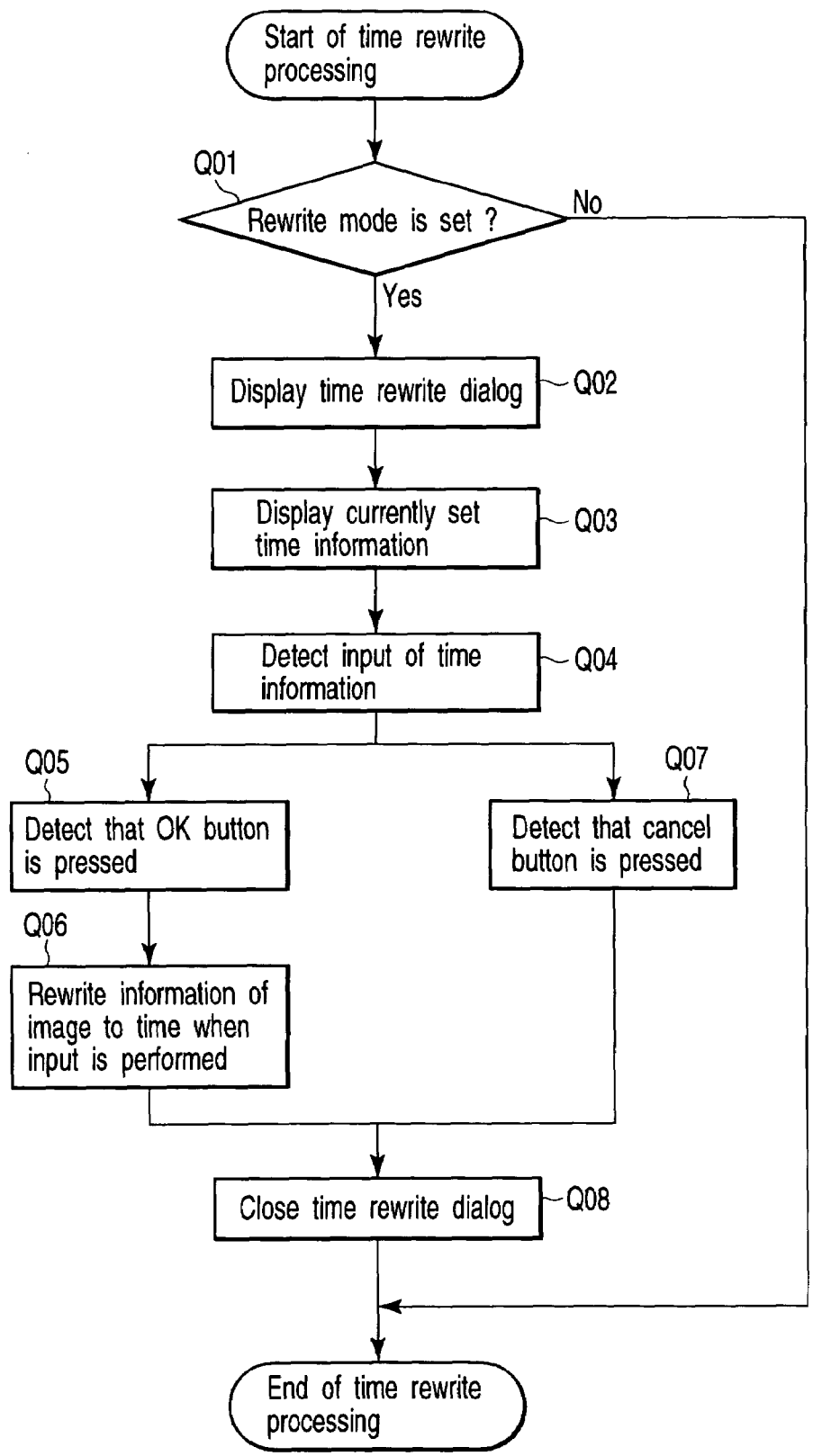
FIG. 23 is a flowchart showing a time rewrite processing procedure.

At a step Q01 in FIG. 23, whether the time information rewrite mode is set to "execute" is checked. This mode is a mode set in the mode change processing shown in FIG. 13. Furthermore, when the time information rewrite mode is set to "not execute", this processing is terminated to return to the date information change processing.

Figure 24:
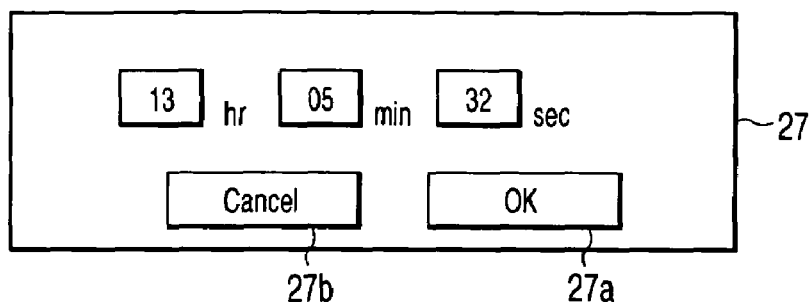
FIG. 24 is a view showing a time rewrite dialog.

If the time information rewrite mode is set to "execute", a time rewrite dialog which is used to correct time information is displayed after the drag and drop operation at a step Q02. FIG. 24 is a view showing the time rewrite dialog 27. The time rewrite dialog 27 shows an OK button 27a and a cancel button 27b as well as time information provided to an image.

When a user inputs time information and operates the OK button 27a, the time information given to the image is replaced with the input time information at steps Q04 to Q06. On the other hand, at a step Q07, when a user operates the cancel button 27b, the time is not rewritten. Moreover, at a step Q08, the time rewrite dialog 27 is closed to return to the date information change processing.

Subsequently, at a step P41 in FIG. 21, image save processing (FIG. 20) is executed. Since this image save processing is the same as the procedure shown in FIG. 20, its detailed explanation will be eliminated. Additionally, the date information change processing shown in FIG. 21 is terminated, and the drag and drop processing depicted in FIG. 19 is also terminated.

A "my favorite" area will now be described. The "my favorite" area is provided in the display area 2 in the image managing screen 1, and it is an area in which a user's favorite date can be registered.

Figure 25:
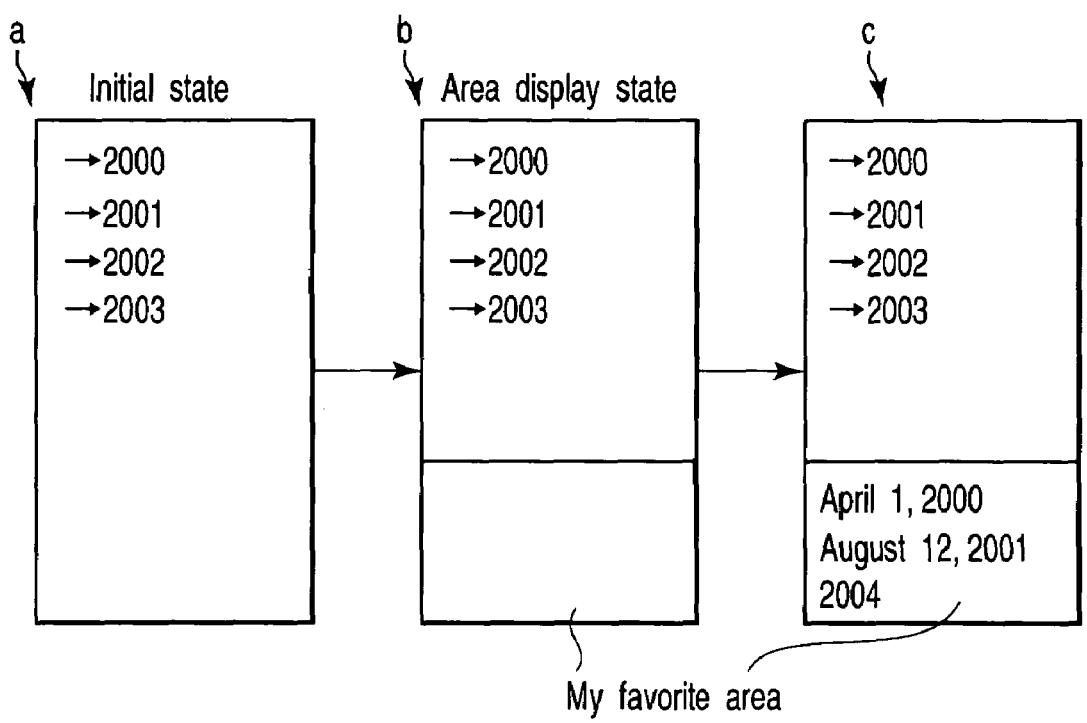
FIG. 25 is a view illustrating an operation of a "my favorite" area.

FIG. 25 is a view illustrating an operation of the "my favorite" area. A screen a in FIG. 25 shows an initial state of the display area 2. In this state, the "my favorite" area is not displayed. Then, when a user operates a "my favorite" area display button 6, the "my favorite" area shown in a screen b in FIG. 25 is displayed. A specific date can be registered in this "my favorite" area by dragging and dropping the date from the period display area 5. Additionally, not only year/month/day but also a year alone or a year and a month alone can be registered. Further, when an image is dragged and dropped, a date associated with this image can be registered. This "my favorite" area can be provided with the function equal to that of the period display area 5.

When a user operates the "my favorite" area display button 6, or when a user drags and drops year/month/day in the "my favorite" area, for example, "my favorite" processing (FIG. 26) is executed at a step S10 in FIG. 12.

Figure 26:
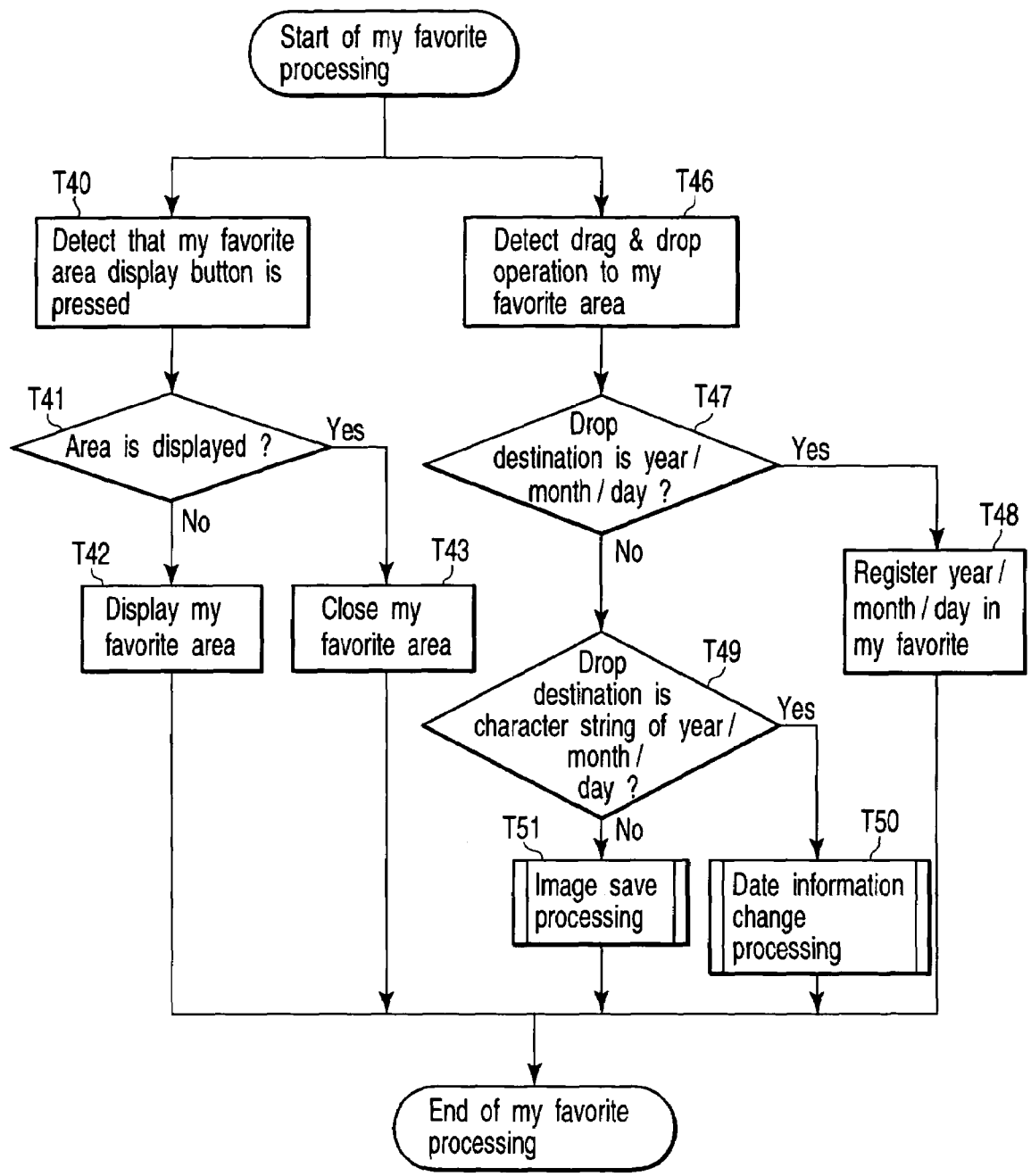
FIG. 26 is a flowchart showing a "my favorite" processing procedure.

At steps T40 to T41 in FIG. 26, when it is detected that the "my favorite" area display button 6 is pressed, whether the "my favorite" area is displayed is checked. Furthermore, the "my favorite" area is displayed at a step T42 when it is not displayed, and the "my favorite" area is closed at a step T43 when it is displayed.

At steps T46 to T47 in FIG. 26, when the drag and drop operation to the "my favorite" area is detected, whether a target of the drop operation is a date or an image is checked. If a target of the drop operation is a date, this date is registered in the "my favorite" area at a step T48.

On the other hand, if a target of the drop operation is an image, whether a destination of the drop operation is a character string of a date in the "my favorite" area is checked. If the destination is a character string, date information change processing (FIG. 21) is executed at a step T50. This date information change processing is the same as the processing shown in FIG. 21, and hence its detailed explanation will be eliminated. On the other hand, when the destination of the drop operation is not a character string, image save processing (FIG. 20) is executed at a step T51. Since this image save processing is the same as the processing shown in FIG. 20, its detailed explanation will be eliminated.

When a user operates the end button 13 in the image managing screen 1, it is detected that the end button 13 is pressed at a step S11 in FIG. 12, thereby terminating this image managing processing.

This image managing apparatus realizes not only a system which displays a list of images having a target date by tracking a selection of a year, a selection of a month and a selection of a day but also a system which displays a list of images in a period selected in units of each of year/month/day. Therefore, various kinds of information can be displayed in accordance with each selection, and a desired image can be efficiently selected from a long period. Furthermore, this image managing method can execute transitions of images in these display systems by simple operations.

Moreover, in this embodiment, different unit periods can be simultaneously displayed and selected in one area, thereby improving the operability.

Additionally, in this embodiment, an image file fetched from an external device can be classified and stored in a folder corresponding to a date of this image file based on time information stored in this image file by one operation in a screen of an image browser. Further, a folder having a specific date can be selected and stored by the same operation. Therefore, the work operation can be efficiently carried out.

Furthermore, in this embodiment, capture time information of a plurality of images captured by a camera having a clock whose time setting is inaccurate can be readily corrected by the drag and drop operation.

It is to be noted that each function described in the foregoing embodiment may be constituted by using hardware, or it may be realized by reading a program having each function written therein by computer using software. Moreover, each function may be appropriately constituted by selecting either software or hardware.

Additionally, each function can be also realized by enabling a computer to read a program stored in a non-illustrated storage medium. Here, the storage medium in this embodiment can take any storage mode as log as it is a storage medium which can record a program therein and can be read by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image managing method of an image managing apparatus having an image memory which stores an image file provided with date and time information, and a display portion which displays a first display area and a second display area, comprising:
   selecting a display mode as a system which displays in the second display area;
   displaying a plurality of unit periods which are used to select a period in the first display area;
   selecting at least one unit period from the plurality of unit periods displayed in the first display area;
   displaying a calendar of the selected unit period in the second display area when the selected display mode is a calendar display mode;
   extracting from the image memory an image file provided with date and time information included in the selected period when the selected display mode is an index display mode; and
   displaying an index image of the extracted image file in the second display area.

2. The imaging managing method according to claim 1, wherein the first display area hierarchically displays a plurality of unit periods, and an arbitrary hierarchical period in the plurality of unit periods can be selected in the selection of the unit period.

3. The image managing method according to claim 2, wherein the unit period includes at least one of a year, a month and a day.

4. The image managing method according to claim 3, further comprising:
   displaying an index image of an image file provided with the same date as the selected date in the second display area irrespective of the display mode, when the selected unit period is a day.

5. The image managing method according to claim 3, wherein at least one of index images displayed in the second display area is selected,
   the image managing method further comprising:
   changing date and time information corresponding to the index image in accordance with the dropped unit period, when at least one selected index image is dropped to an icon or a character string or a position in a screen indicative of the unit period.

6. The image managing method according to claim 5, further comprising:
   changing date and time information of image files other than an image file having the oldest date and time information among a plurality of images in cooperation with change of the date and time information of the image file having the oldest date and time information while maintaining a time difference specified by date and time information in the plurality of selected image files, when a plurality of index images displayed in the second display area are selected and dropped to an icon or a character string or a position indicative of the unit period.

7. The imaging managing method according to claim 1, further comprising:
   displaying a plurality of second calendars corresponding to the plurality of selected unit periods in the second display area, in cases where the selected display mode is the calendar display mode, when a plurality of unit periods are selected in the selection of the unit period, and
   displaying an index image of an image file provided with date and time information included in one of the plurality of selected unit periods, in cases where the selected display mode is the index display mode, when a plurality of unit periods are selected in the selection of the unit period.

8. The image managing method according to claim 1, wherein the image managing apparatus further has an image input portion which inputs an image file from the outside of the image managing apparatus, and a folder generation portion which generates a folder corresponding to the unit period,
   the image managing method further comprising:
   generating a folder which includes the date and time provided to the image file in a period thereof and corresponds to the unit period, when an image file input from the image input portion is stored in the image memory, if there is no folder which includes the date and time provided to the image file in a period thereof and corresponds to the unit period, and storing the image file in the folder.

9. The image managing method according to claim 8, wherein one or a plurality of index images displayed in the second display area is selected, the image managing method further comprising:

storing an image corresponding to the index image in a folder which includes the date and time provided to the image in a period thereof and corresponds to the unit period, when the selected index image is dropped in an area where the unit period of the first display area is not displayed, generating a folder which includes the date and time and corresponds to the unit period provided to the image corresponding to the dropped index image, when there is no folder which includes in a period thereof the date and time and corresponds to the unit period, and storing an image file corresponding to the dropped index image in the folder.

10. A recording medium storing a computer-readable image managing program of an image managing apparatus having an image memory which stores an image file provided with date and time information, and a display portion which displays a first display area and a second display area, the image managing program, when executed by a computer, performs a method comprising:

a display mode selection step which selects a display mode as a system which displays in the second display area;

a period display step which displays a plurality of unit periods which are used to select a period in the first display area;

a period selection step which selects at least one unit period from the plurality of unit periods displayed in the first display area at the period display step;

a calendar display step which displays in the second display area a calendar of the unit period selected at the period selection step when the selected display mode is a calendar display mode; and an index image display step which extracts from the image storing means an image file provided with date and time information included in the period selected at the period selection step and displays an index image of the extracted image file in the second display area when the selected display mode is an index display mode.

11. The recording medium according to claim 10, wherein the first display area hierarchically displays a plurality of unit periods, and an arbitrary hierarchical period in the plurality of unit periods can be selected at the period selection step.

12. The recording medium according to claim 11, wherein the unit period includes at least one of a year, a month and a day.

13. The recording medium according to claim 12, wherein, when the unit period selected at the selection step is a day, the computer is caused to further execute a step which displays in the second display area an index image of an image file provided with the same date as the selected date irrespective of the display mode.

14. The recording medium according to claim 12, wherein the image managing program, when executed by the computer, performs a method further comprising:

an index selection step which selects one or a plurality of index images displayed in the second display area; and a date and time information change step which changes date and time information corresponding to at least one index image selected at the index selection step in accordance with the unit period as a target of a drop operation when the index image is dropped to an icon or a character string or a position in a screen indicative of the unit period.

15. The recording medium according to claim 14, wherein the date and time information change step changes date and time information of image files other than an image file having the oldest date and time information in a plurality of images in cooperation with change of the date and time information of the image file having the oldest date and time information while maintaining a time difference specified by date and time information in the plurality of selected image files.

16. The recording medium according to claim 10, wherein, when a plurality of unit periods are selected at the period selection step, the calendar display step displays a plurality of second calendars corresponding to the plurality of selected unit periods, and when a plurality of unit periods are selected at the period selection step, the index image display step displays an index image of an image file provided with date and time information included in one of the plurality of selected unit periods.

17. The recording medium according to claim 10, wherein the image managing apparatus further has an image input portion which inputs an image file from the outside of the image managing apparatus, and a folder generation portion which generates a folder corresponding to the unit period, and in cases where an image file input from the image input portion is stored in the image memory, when there is no folder which includes the date and time provided to the image file in a period thereof and corresponds to the unit period, the program causes the computer to further execute;

a folder generation step which generates a folder which includes the date and time and corresponds to the unit period; and an image file storage step which stores the image file in the folder in the image memory.

18. The recording medium according to claim 17, wherein the image managing program, when executed by the computer, performs a method further comprising:

an index selection step which selects one or a plurality of index images displayed in the second display area;

an index drop step which drops an index image selected at the index selection step to an area in which the unit period of the first display area is not displayed;

a second image file storage step which stores an image corresponding to the index image selected at the index drop step in a folder in the image memory which includes the date and time provided to the image in a period thereof and corresponds to the unit period;

a second folder generation step which generates a folder which includes in a period thereof the date and time provided to the image corresponding to the selected index image and corresponds to the unit period when there is no folder which includes the date and time and corresponds to the unit period; and a third image file storage step which stores the image file in a folder generated at the second folder generation step.

19. An image managing apparatus having an image memory which stores an image file provided with date and time information, and a display portion which displays a first display area and a second display area, comprising:
- a display mode selection portion which selects a display mode as a system which displays in the second display area;
- a period display portion which displays a plurality of unit periods which are used to select a period in the first display area;
- a period selection portion which selects at least one unit period from the plurality of unit periods displayed in the period display portion;
- a calendar display portion which displays a calendar of the unit period selected by the period selection portion in the second display area when the selected display mode is a calendar display mode; and
- an index image display portion which extracts from the image memory an image file provided with date and time information included in the unit period selected by the period selection portion and displays an index image of the image file in the second display area when the selected display mode is an index display mode.

* * * * *